(12) United States Patent
Mäkelä et al.

(10) Patent No.: US 7,480,215 B2
(45) Date of Patent: Jan. 20, 2009

(54) READ WRITE DEVICE FOR OPTICAL MEMORY AND METHOD THEREFORE

(75) Inventors: Jakke Mäkelä, Turku (FI); Janne Kari Aikio, Oulu (FI); Sanna Aikio, Oulu (FI); Kari Juhani Kataja, Oulu (FI); Teemu Alajoki, Oulu (FI)

(73) Assignee: Nokia Corporation, Espoo (FI)

( * ) Notice: Subject to any disclaimer, the term of this patent is extended or adjusted under 35 U.S.C. 154(b) by 198 days.

(21) Appl. No.: 10/535,606

(22) PCT Filed: Nov. 27, 2002

(86) PCT No.: PCT/FI02/00954

§ 371 (c)(1),
(2), (4) Date: May 19, 2005

(87) PCT Pub. No.: WO2004/049319

PCT Pub. Date: Jun. 10, 2004

(65) Prior Publication Data

US 2006/0018233 A1 Jan. 26, 2006

(51) Int. Cl.
*G11B 7/00* (2006.01)

(52) U.S. Cl. ............ 369/44.19; 369/44.37; 369/124.03; 720/690

(58) Field of Classification Search ............ 369/124.03, 369/44.38, 44.19; 720/690
See application file for complete search history.

(56) References Cited

U.S. PATENT DOCUMENTS

| | | | |
|---|---|---|---|
| 4,157,568 A * | 6/1979 | Ohki et al. ............... 369/44.24 |
| 4,253,723 A | 3/1981 | Kojima et al. |
| 4,295,162 A * | 10/1981 | Carlsen ...................... 386/128 |
| 4,334,299 A * | 6/1982 | Komurasaki et al. ...... 369/44.38 |
| 4,344,164 A * | 8/1982 | Bricot et al. ............. 369/44.14 |
| 4,423,495 A * | 12/1983 | Musha et al. ............. 369/44.25 |
| 4,546,463 A * | 10/1985 | Opheij et al. .......... 369/112.17 |
| 4,669,073 A * | 5/1987 | Wakabayashi et al. ... 369/44.19 |
| 4,703,408 A * | 10/1987 | Yonezawa et al. ........ 369/44.13 |
| 4,855,987 A * | 8/1989 | Versluis .................. 369/112.23 |
| 5,033,040 A * | 7/1991 | Fujita ..................... 369/44.37 |

(Continued)

FOREIGN PATENT DOCUMENTS

JP 53-048703 5/1978

(Continued)

*Primary Examiner*—Joseph H Feild
*Assistant Examiner*—Peter Vincent Agustin
(74) *Attorney, Agent, or Firm*—Ware, Fressola, Van Der Sluys & Adolphson LLP

(57) ABSTRACT

A method and miniaturizable device is described to read/write information to an optical storage medium (11). A device comprises one or more light sources (12) bounded up with an access unit (10) which is arranged to be controllable to a position, in which light beams (21, 22) are transmitted transversal towards an optical storage medium, and reflected light beams (33) are analysed by a detector element (18, 26) which further informs the access unit whether to move or stand still to keep light beams in focus and on track. A device according to the invention is possible to implement in a small size and low weight due to reduced component count and thin access unit geometries. A communication device (80) according to the invention may be implemented to fulfil a crucial need for ultraminiature range of communication devices.

51 Claims, 22 Drawing Sheets

U.S. PATENT DOCUMENTS

| | | | |
|---|---|---|---|
| 5,155,717 A * | 10/1992 | Bakx | 369/44.37 |
| 5,442,597 A * | 8/1995 | Spruit et al. | 369/13.02 |
| 5,504,731 A * | 4/1996 | Lee et al. | 369/112.24 |
| 5,568,458 A * | 10/1996 | Tani et al. | 369/44.35 |
| 5,657,164 A * | 8/1997 | Shuman | 359/634 |
| 5,771,219 A | 6/1998 | Miyamoto | |
| 6,215,755 B1 | 4/2001 | Snyder et al. | |
| 6,278,682 B1 | 8/2001 | Takishima et al. | |
| 6,704,256 B2 * | 3/2004 | Berg et al. | 369/44.19 |
| 6,819,639 B1 * | 11/2004 | Gelbart | 369/44.38 |
| 6,845,079 B2 * | 1/2005 | Lee et al. | 369/124.03 |

FOREIGN PATENT DOCUMENTS

| | | |
|---|---|---|
| JP | 07-169085 | 7/1995 |
| JP | 9073657 | 3/1997 |
| WO | WO 9809392 | 3/1998 |

* cited by examiner

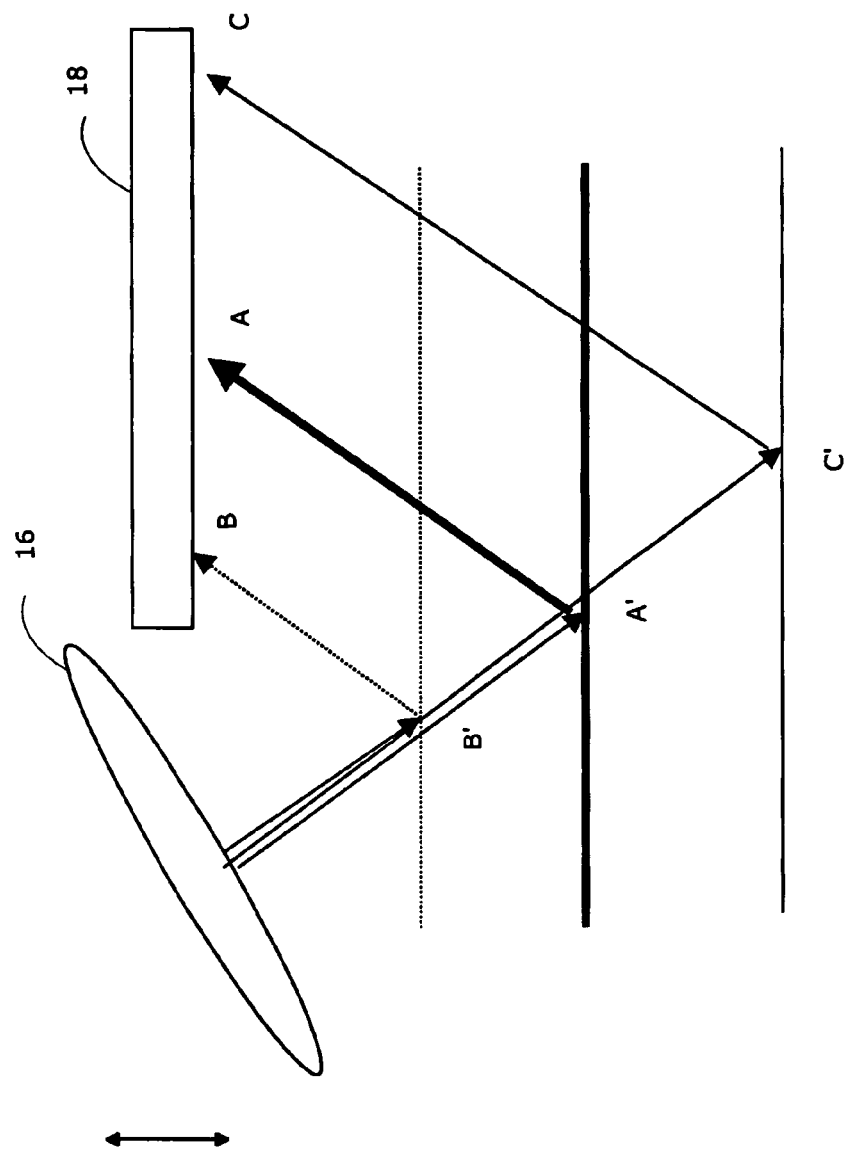
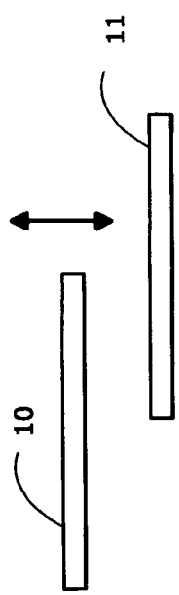
Fig 6b.
Fig 6a.

READ WRITE DEVICE FOR OPTICAL MEMORY AND METHOD THEREFORE

CROSS REFERENCE TO RELATED APPLICATIONS

This application is for entry into the U.S. national phase under §371 for International Application No. PCT/FI02/000954 having an international filing date of Nov. 27, 2002, and from which priority is claimed under all applicable sections of Title 35 of the United States Code including, but not limited to, Sections 120, 363 and 365(c).

TECHNICAL FIELD OF THE INVENTION

The present invention relates to the field of optical storage systems, and more particularly to reading out information from an optical storage medium and to writing information onto the optical storage medium.

BACKGROUND OF THE INVENTION

An optical storage system is composed of an optical disc drive system and an optical storage medium, such as an optical disc. The optical disc drive has a light beam source, a light beam distribution system and a light beam detection system for reading out information from the optical disc and recording information onto the optical disc. The read and write operation functionality of the optical disc drives is traditionally accomplished by using an optical pick-up unit (OPU) which is arranged to locate so that the light beam is angled perpendicular to the optical disc for radiating and detecting purposes. This kind of read and write operation is designated as the perpendicular operation in this present application.

The optical pick-up units of prior art typically have a laser light emitting diode, light detector, optical lens and device e.g. voice coil to position the lens for proper focusing and tracking during read and write operation. The OPU moves radially to access data tracks on the optical disc by using a sliding rail system connected to a motor or the fixed OPU is connected to a geared rotatably positioned optical pipe connected to a motor. When the optical disc rotates around its center by means of a motor and the OPU or a light guide head connected to the OPU moves radially across the optical disc, data tracks of the optical disc are accessed.

The optical pick-up units of prior art typically use a single light beam path toward the optical storage medium. Optical light guides are used as a channel for directing the light beam from the light source to the lens system adjacent to the track of the optical disc and for directing back the reflected light beam from the track of the optical disc to the detection system adjacent to the light source. In a typical embodiment, a polarizing beam splitter (or similar system using e.g. semi-reflecting mirrors) is used to direct the light beam to the lens system.

The traditional CD and DVD technology is considered to be known art and covered extensively by patents and published literature; hence, it is not mentioned here explicitly. Some examples of non-standard solutions for prior art optical pick-up units are described in the following documents: WO 99/00793, U.S. Pat. Nos. 4,581,529, 5,481,515, 5,835,458 and 6,256,283. Recent prior art for non-standard fixed-arm systems includes documents WO 02/059888A2 and WO 02/059887A2.

There are certain limitations related to the OPU systems of prior art. A mass of the movable OPU or the geared rotatably positioned optical light guide head is heavy. Especially a laser source is a weighty and large-size component and the mass of the laser source is centered on the movable OPU or the movable light guide head in prior art systems. The weight of the movable OPU causes together with the pitching motion of the disc problems in defocussing and sensitivity to the track angle error. Many optical storage systems of prior art require astigmatism in the system for error analysis, and this also results in higher component count in the form of used astigmatism elements. All extra components cause weight increase and complexity to the system which extends access times and increases power consumption of the OPU system. The access times are outstandingly long in case of the movable sledge OPU systems.

SUMMARY OF THE INVENTION

An object of the present invention is to solve the problems related to prior art and thus to provide a device and method for reading out data from the optical storage medium and writing data to the optical storage medium enabling a small-size and low-weight optical storage system. Another object of the invention is to provide a method and device for reading out data from the optical storage medium and writing data to the optical storage medium to keep an optical storage system in focus and on track to ensure a reliable operation.

The object of the present invention is fulfilled by providing a device and method where a single light beam or multiple light beams are arranged to be angled transversal to the optical storage medium for radiating (emitting) the beams and detecting (receiving) the reflected beams. The beam is transversal when its centre beam essentially deviates from the perpendicular direction to the optical storage medium.

In accordance with the present invention there is provided a device comprising an optical storage medium drive and at least one access unit for reading out data from and writing data to an optical storage medium comprising a plurality of data tracks, said device comprising: at least one light source arranged to produce at least one first light beam and at least one second light beam; transmitting means arranged to transmit and guide said first light beam and said second light beam towards said data tracks of the optical storage medium; and detecting means arranged to detect light beams that are reflected from the surface of the optical storage medium, is characterised in that said access unit is arranged to pivot on one end three-dimensionally, said transmitting means and said detecting means are arranged to move in accordance with the movement of said access unit, said transmitting means are arranged to guide said first light beam and said second light beam transversal towards data tracks of the optical storage medium, and said detecting means are arranged to receive the reflected beams of said first light beam or said second light beam from said data tracks of the optical storage medium.

In accordance with the present invention there is provided a method for reading out data from and writing data to an optical storage medium in a device comprising at least one access unit, the method comprising steps, in which: at least one optical storage medium comprising a plurality of data tracks, stores data; an optical storage medium driver controls operation of the device; at least one light source produces at least one first light beam and at least one second light beam; said first light beam and said second light beam are transmitted and guided towards said data tracks of the optical storage medium; and the light beams that are reflected from the surface of the optical storage medium are detected, is characterised in that it further comprises steps, in which: said first light beam and said second light beam are guided transversal towards said data tracks of the optical storage medium; the reflected beams of said first light beam or said second light beam from said data tracks of the optical storage medium are received; and said access unit is moved three-dimensionally in relation to a pivot point on one end to focus and track said first and second light beams.

One preferred embodiment of the present invention is considered to be a communication device and a method where an access unit, preferably an arm unit, is controllable to a position, in which a read light beam is directed transversal towards data tracks of the optical storage medium and write light beam perpendicular to said data tracks of the optical storage medium, and in which the light beam is kept in focus and on track by following a change in the intensity distribution of the reflected light beam identified by a detector. According to one preferred embodiment a light source emitting light beams locates at or near a pivot point on one end of the access unit.

In this application three-dimensionally means that the access unit moves in relation to vertical (x) and horizontal (y) axis and rotates in relation to longitudinal (z) axis at the pivot point. In this application a term focusing signifies same as keeping in focus and a term tracking signifies same as keeping on track.

The present invention provides a novel way of implementing the optical read/write system which enables to reduce component count by a new optical component arrangement which simplifies the optical system. The moving access unit according to the present invention is possible to manufacture using thinner geometries and thus the moving acces unit fulfils the requirements of small size and low weight which are crucial needs in the ultraminiature range of optical storage devices.

In addition, the present invention provides a novel and accurate way of keeping the optical read/write system in focus and on track. The combination of using transversal light beams to be directed to and reflected from the optical storage medium and the use of the moving access unit provides a simple focusing and tracking method. The focus-error and track-error signals can be identified by following the change in the intensity distribution of the reflected light beam. The reliable operation is achieved by the simultaneous transversal light beam focusing and tracking during the read and/or write operation.

In addition, a smaller size and lower weight of the moving access unit according to the present invention also enables faster random access time of the optical storage device. The movable mass of the access unit becomes still lighter by fixing all possible components (including a light source) onto the pivot point of the access unit. This minimizes the angular momentum needed to move the arm. By reducing component count the method and device according to the invention thus reduces power consumption. The component count of optical components can be minimized in the simplest implementation of the present invention significantly. Due to reduced component count space savings are also achieved and production costs become lower.

Further the device and method according to the present invention does not put any additional restrictions on the optical storage medium and all existing optical disc media can be used.

Some embodiments of the present invention are described in the dependent claims. The main physical characteristics and simulation results for the invention are also described in the attached report, which supplements the patent application but does not supercede it. The report contains some detailed calculations which have been left out of this application, as they are considered details of one specific embodiment rather than pertaining to the basic invention. However, they are relevant for establishing the technical feasibility of the invention.

The novel features which are considered as characteristic of the invention are set forth in particular in the appended Claims. The invention itself, however, both as to its construction and its method of operation, together with additional objects and advantages thereof, will be best understood from the following description of specific embodiments when read in connection with the accompanying drawings and also the attached report.

BRIEF DESCRIPTION OF THE DRAWINGS

FIG. 6a illustrates a fundamental idea of a focusing signal detection of the device according to the invention.

FIG. 6b illustrates a fundamental idea of a focusing signal detection of the device according to the invention.

DETAILED DESCRIPTION

Figure 1A:
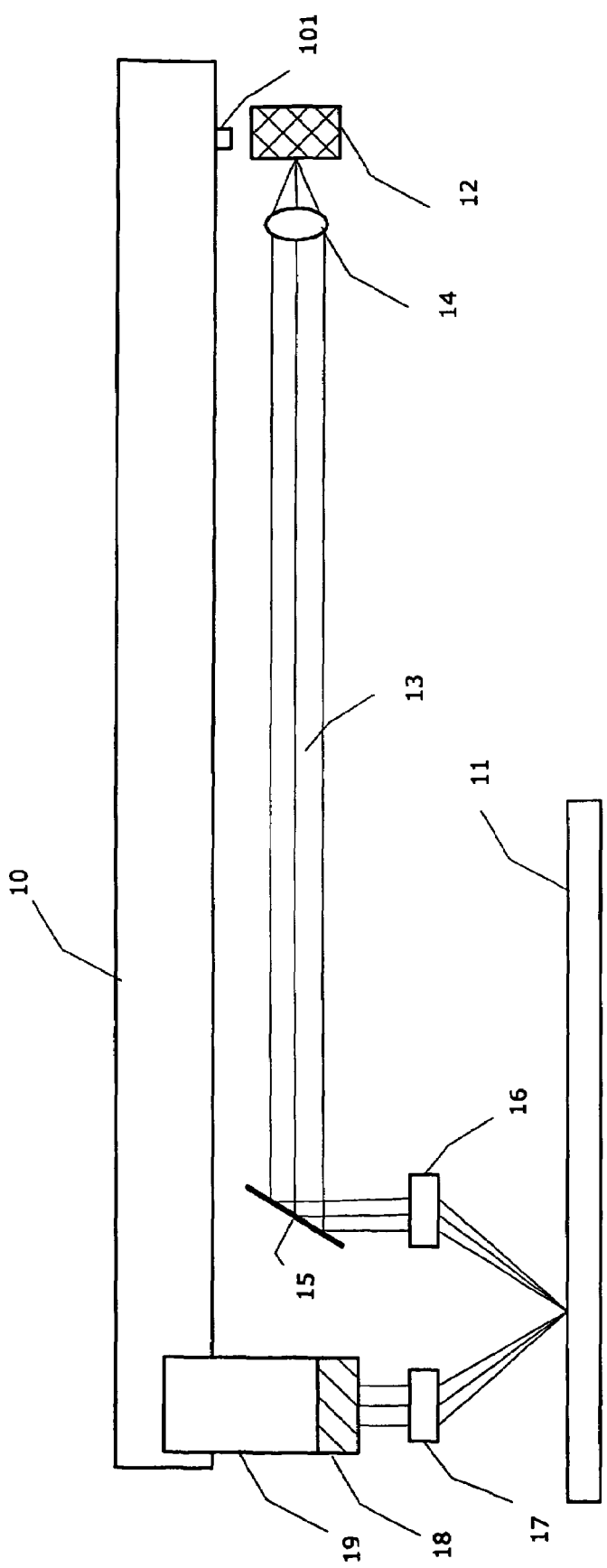
FIG. 1a illustrates a side projection of the device according to one embodiment of the present invention.

FIG. 1a illustrates a principal set up of the device according to the present invention for reading out data from an optical storage medium and for writing data to an optical storage medium. The optical storage medium 11 can be any CD-type readable and/or writeable optical disc, such as CD-R, CD-ROM, CD-RW, DVD or any other existing optical disc media or future implementations of this kind. The optical storage medium 11 comprises data tracks, and adjacent data tracks are decoupled from each other by a narrow area. The data tracks may be pre-grooved or stamped and made of suitable material to form optically resolvable structures on the optical storage medium. Bit patterns that produce adequate optical intensity variation on the data tracks, e.g. the pitted structure of the medium, form a basis for storing and changing information. The device also comprises an optical storage medium drive (not depicted), which can be of any commercial type available. The movement of the optical storage medium is arranged by the optical storage medium drive.

The access unit 10 pivots on its one end 101, which is called here a pivot point 101, three-dimensionally. Three-dimensionally means that the access unit moves in relation to vertical (x), horizontal (y) and longitudinal (z) axis at the pivot point. Thus the access unit is capable of being controlled in upwards-downwards and lateral direction in relation to its pivot point, as well as in direction of rotation related to axis of revolution in relation to the pivot point of the access unit. By controlling the access unit in relation to the tilted (z axis) direction the push-pull movement of the access unit is produced, which push-pull movement keeps the z axis perpendicular to the surface of the optical storage medium. The access unit 10 may preferably be an arm unit, which may also be called a pivoting arm or moving arm. The motion of the arm in the x,y,z directions may be controlled e.g. by acoustic loops similar to those controlling the motion of the small lenses in traditional CD drives. The access unit can be realized in a number of alternative ways; the key point is that orientation of the beam must be controllable in the x, y, and z directions.

Other main units of the device illustrated in FIG. 1a are a light source 12 for emitting a light beam 13, an optical component 15, such as a mirror, prism or other suitable optical component, for bending the light beam towards the optical storage medium 11, another optical component 16, such as a lens or diffractive optical element (DOE), for bending and focussing the light beam, an optical component 17, such as a lens or diffractive optical element (DOE), for collimating and/or focussing the reflected light beam and a detector element 18 for receiving and detecting the reflected light beam.

The detector element 18 has two or more, preferably four, detecting surfaces for analysing focus and tracking signals. Collimating optics 14 may be used for collimating the light beam. The transmission of the light beam 13 from the light source 12 to the optical components 15, 16 can be done in free space, but it is also possible to use an optical component (not depicted), such as a waveguide, lightguide or alike, for transmitting the light beam. All above mentioned units 12-18 of the device are arranged so that they move in accordance with the movement of the access unit 10, i.e. they are hung to the access unit with appropriate fastenings means an example of which is a supporting body 19 in FIG. 1a. The units 12 and 18 are also connected electrically to the access unit 10 and a main control unit (not depicted) of the device. The light source 12 is preferably located at or near the pivot point 101 in order to minimize the angular momentum needed to move the arm.

In accordance with the above mentioned set up of the device according to the present invention the light beam emitted from the light source is guided in a transversal angle towards the data tracks of the optical storage medium. The reflected light beam reflected from the surface of the optical storage medium is received in a transversal angle by the detector element 18 and associated optical components 17. Due to the different optical paths of the light beams, the separation of the illumination light and the reflected light containing the data signal is occuring naturally.

According to one embodiment of the device a light source 12 may be located at the other end of the access unit 10 than the pivot point 101, i.e. at the access unit, preferably an arm unit, head. In this embodiment the light source is directed in an appropriate angle towards a surface of an optical storage medium and thus no mirror 15 is needed for bending a light beam. Only a DOE 16 is needed to focus a light beam properly. This embodiment requires less components than depicted in FIG. 1a, but it presumes very low weight of a light source to be used.

Figure 1B:
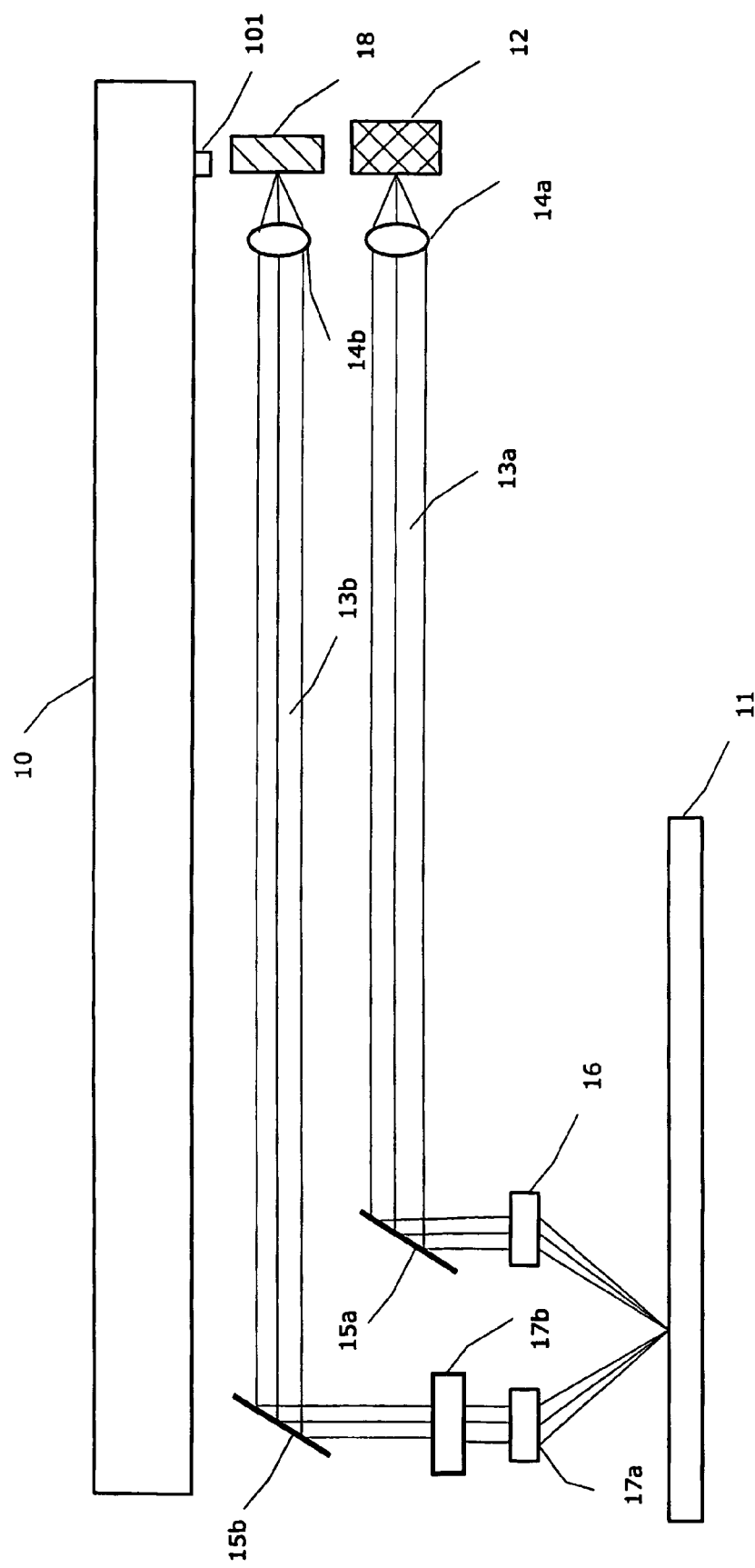
FIG. 1b illustrates a side projection of the device according to another embodiment of the present invention.

FIG. 1b illustrates another embodiment of the device according to the present invention. In this set up of the device the detector element 18 is located at or near the pivot point 101 and the light source 12. When using a single light path propagation of the light beam it is needed in addition to provide another optical component 15b after the focusing component 17a to bend the light beam towards the detector element 18. There may also be provided detecting optics 14b in front of the detector element for focusing the reflected light beam.

According to another embodiment of the device also multiple light paths may be used. FIG. 1b illustrates a splitter component 17b for splitting the light beam into more than one beam. When the splitter component is used there is needed detector optics 14b in front of the detecting element for each beam of the multiple light beams 13b. In this embodiment the light source 12 may emit a single or multiple light paths 13a depending on the type of the light source. In case of the light source emits a single light path 13a the splitter component 17 may be installed in front of the bending component 15a.

Figure 2A:
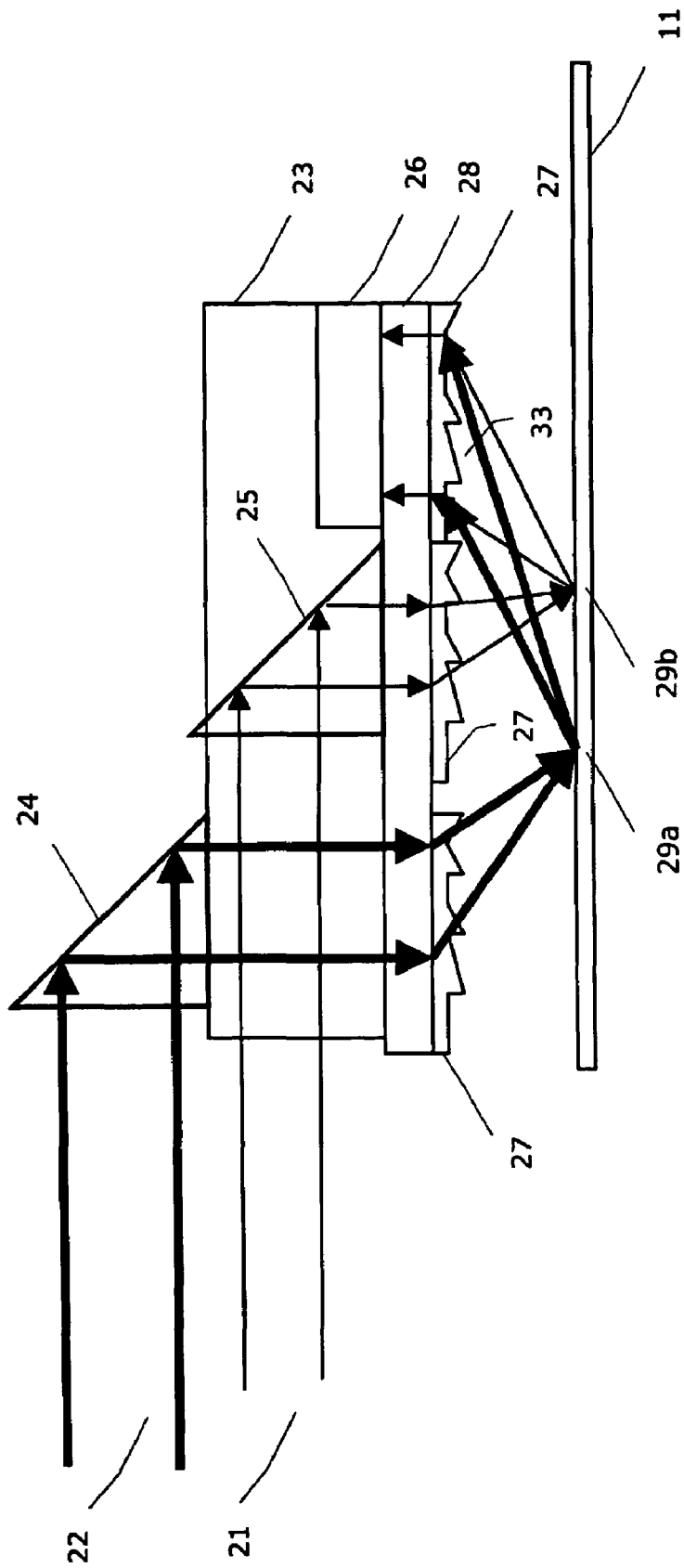
FIG. 2a illustrates an embodiment of an optics set up of the device according to the invention.
Figure 2B:
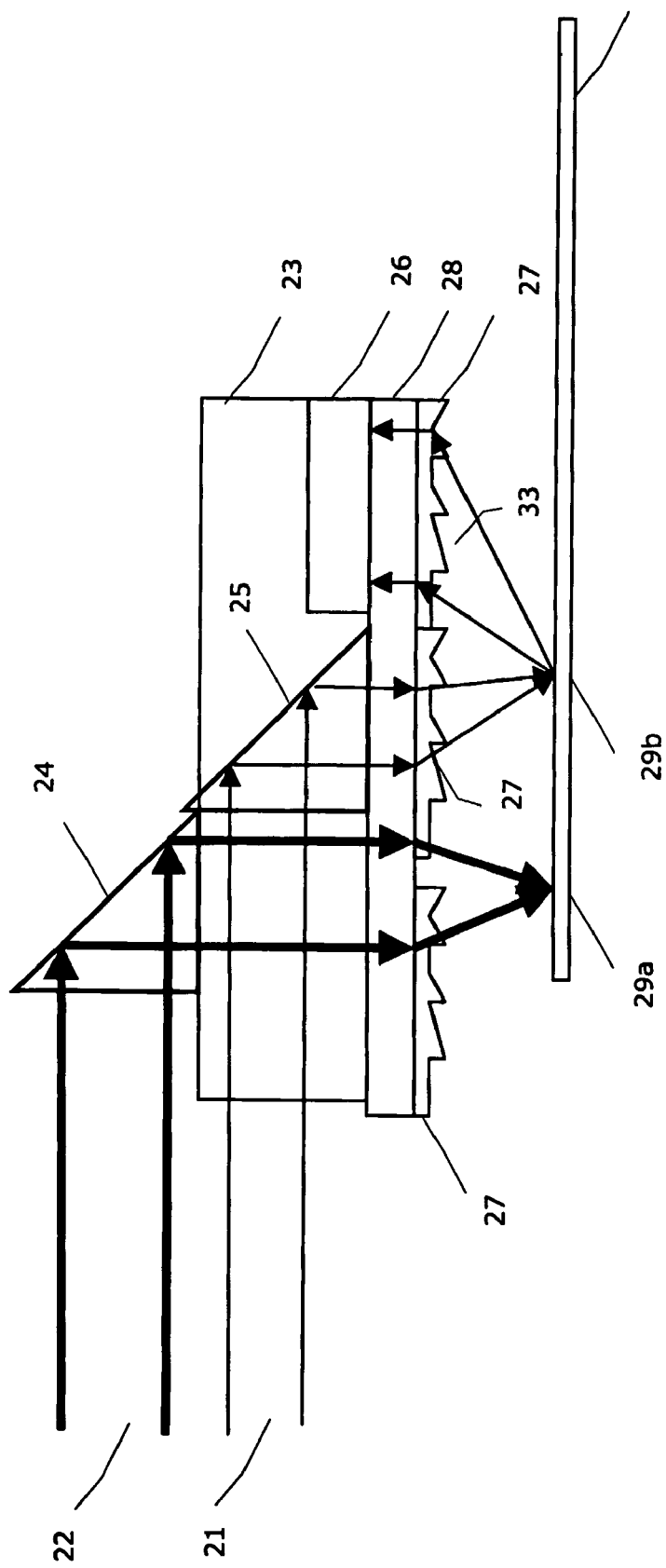
FIG. 2b illustrates another embodiment of an optics set up of the device according to the invention.
Figure 2C:
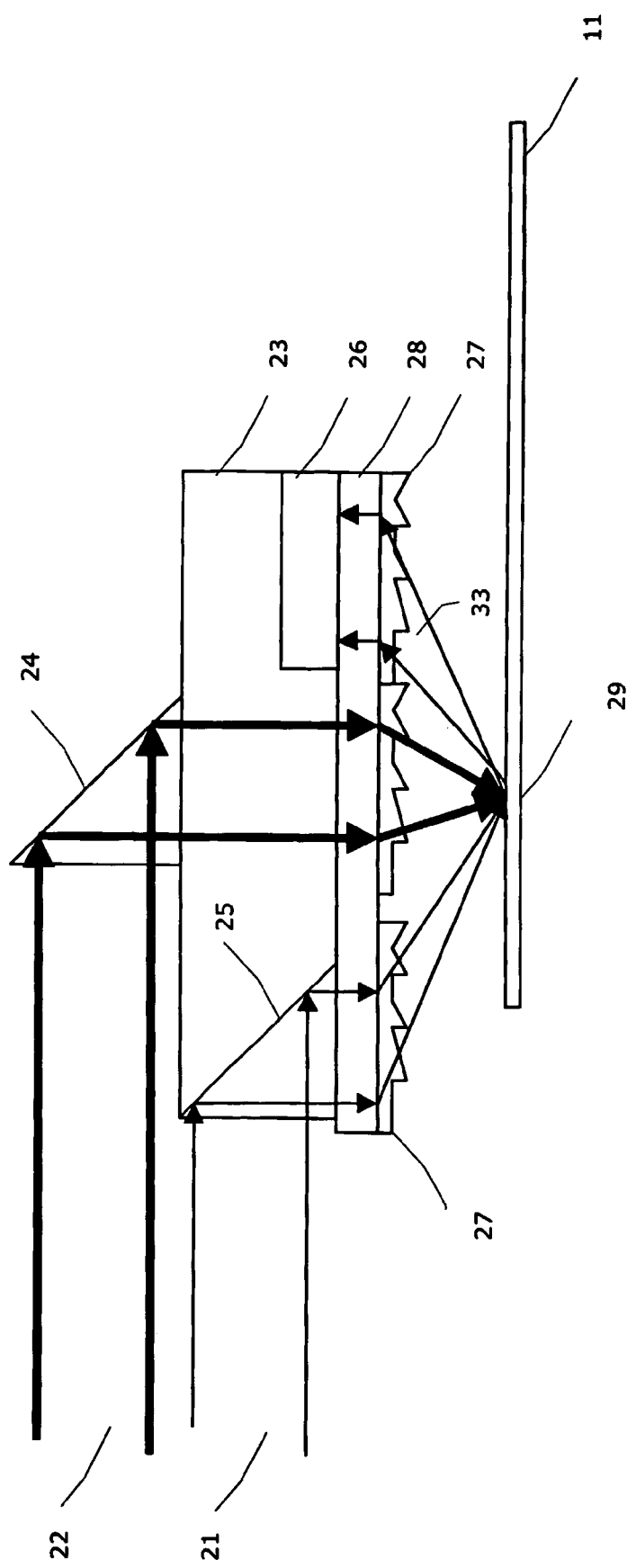
FIG. 2c illustrates another embodiment of an optics set up of the device according to the invention.

FIGS. 2a-2c illustrate optics set up of the device according to some embodiment of the present invention where two light beams 21, 22 are used: one for reading data 21 and the other for writing data 22 (thicker lines). The optics set up of the device comprises mirrors 24, 25 for bending the light beams. Instead of mirrors, also prisms or other suitable optical components may be used for bending the light beams. On the substrate 23 are integrated a detector element 26, transparent element 28 e.g. glass element and diffractive elements (DOE) 27 in front of the transparent element. The reflected light beams 33 are directed towards the detector element 26. In embodiments depicted in FIGS. 2a and 2b the mirror for the light beam 21 is ahead of the mirror 24 for the light beam 22 so that the read beam 21 is arranged to form a spot location 29b of the focussed beam on the optical storage medium 11 in a different location than the other spot location 29a of the focussed beam formed by the write beam 22. According to an embodiment there are separate spot locations for the both focussed beams, namely the reading point 29b and the writing point 29a. These spot locations 29a, 29b may locate to any direction in relation to each other on the data tracks, including location on different tracks, e.g. the other may locate ahead, behind or aside in relation to the other. According to the preferred embodiment of the invention the read beam 21 is arranged to form a spot location 29b of the focussed beam on the optical storage medium 11 preferably slightly ahead of the other spot location 29a of the focussed beam formed by the write beam 22.

FIG. 2a shows one embodiment of the invention that uses the transversal light beams both for reading data and for writing data in relation to the optical storage medium. As shown in FIG. 2b another embodiment of the invention uses the transversal light beam for reading data and the perpendicular light beam for writing data in relation to the optical storage medium. Transversal means here transversal beam towards the optical storage medium and perpendicular means perpendicular beam to the optical storage medium. The synchronization of beam pulses are described later in this description. The synchronization of read and write pulses enable the focus and write operation to take place simultaneously. This embodiment enables fast random access times for writing operation. It provides an extremely small and low-mass optical pick-up unit which is a crucial need in ultraminiature device range and enables fast access. Also due to reduced component count it reduces costs and decreases power consumption.

FIG. 2c illustrates another embodiment of the optics set up of the device using two light beams according to the invention. In this embodiment the read beam 21 and write beam 22 hit the same spot location 29 of the focussed beams. The set up of optics differs from the set up shown in FIG. 2a or 2b in that the mirror 24 is ahead of the mirror 25. As shown in FIG. 2c this embodiment of the invention uses the transversal light beam for reading data and the perpendicular light beam for writing data in relation to the optical storage medium. In consequence of that the focus and track guiding is done by the transversal light beam at the same time when writing operation is done by the perpendicular light beam. The synchronization of read and write pulses are described later in this description. This embodiment of the invention also provides an extremely small and low-mass optical pick-up unit which is a crucial need in ultraminiature device range. Also due to reduced component count it reduces costs and decreases power consumption.

Figure 3A:
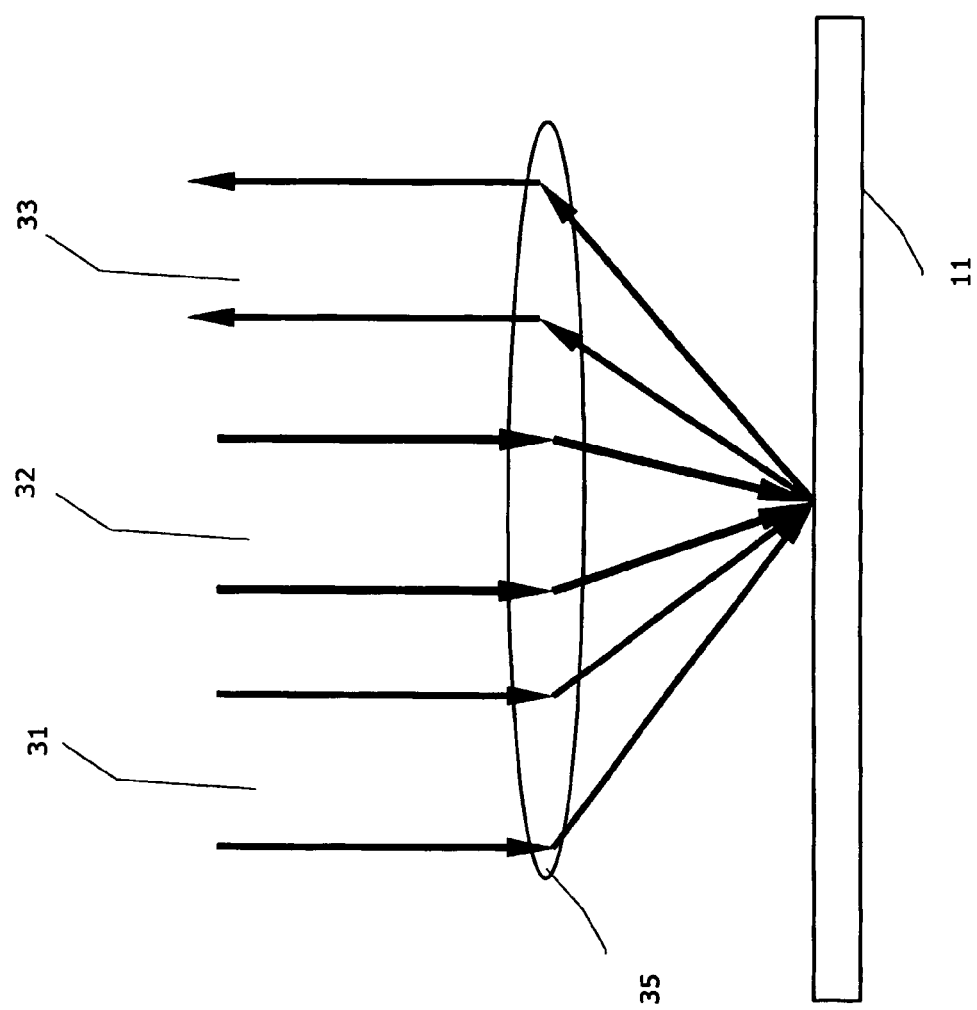
FIG. 3a illustrates an simple embodiment of an optics set up of the device according to the invention.

FIG. 3a shows an embodiment of a simple optics set up of a device according to the invention, where separate read 31 and write beams 32 and reflected read beam 33 are guided through a single lens 35. The diffractive element (not depicted) can be realized as a surface element. Also this embodiment of the invention uses the transversal light beam for reading data and the perpendicular light beam for writing data in relation to the optical storage medium.

Figure 3B:
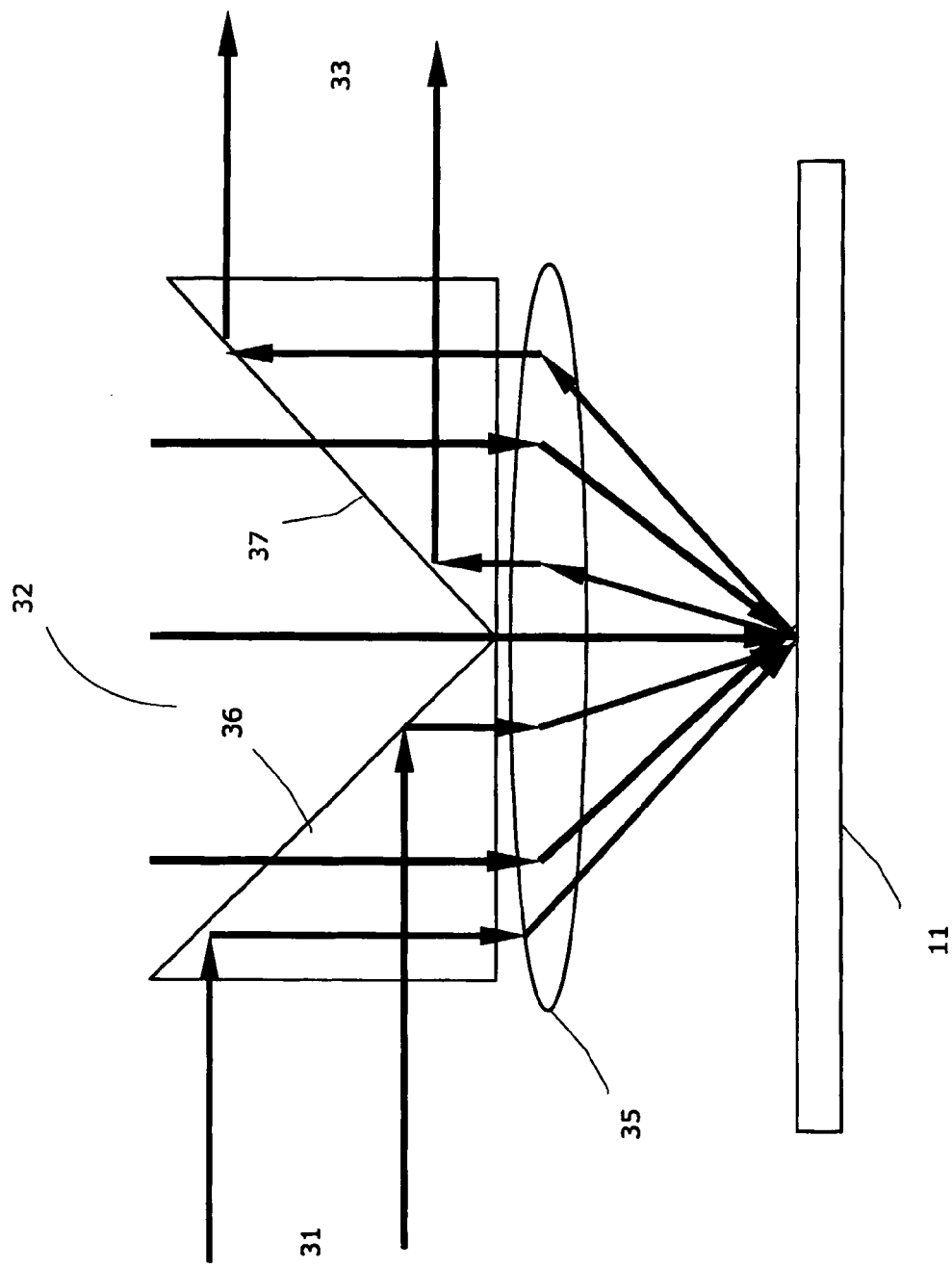
FIG. 3b illustrates another embodiment of an optics set up of the device according to the invention.

FIG. 3b illustrates an embodiment of the optics set up of the device according to 5 the invention, where separate read beam 31 and write beam 32 and reflected read beam 33 are guided through a single lens 35. The diffractive element (not depicted) can be realized as a surface element. In addition optical components 36, 37 are used to separate incoming read beam 31 and reflected read beam 33 from write beam 32 by polarization or wavelength of the beams. The optical component 36, 37 can be realized by using components, such as polarizing splitters and dichroic beam splitters, and in association with these components diffractive elements can be used. This embodiment provides that read and write beams have opposite polarization or different wavelengths and that the medium responds differently to light at these different polarizations or wavelengths (e.g. two-photon operation).

Figure 4A:
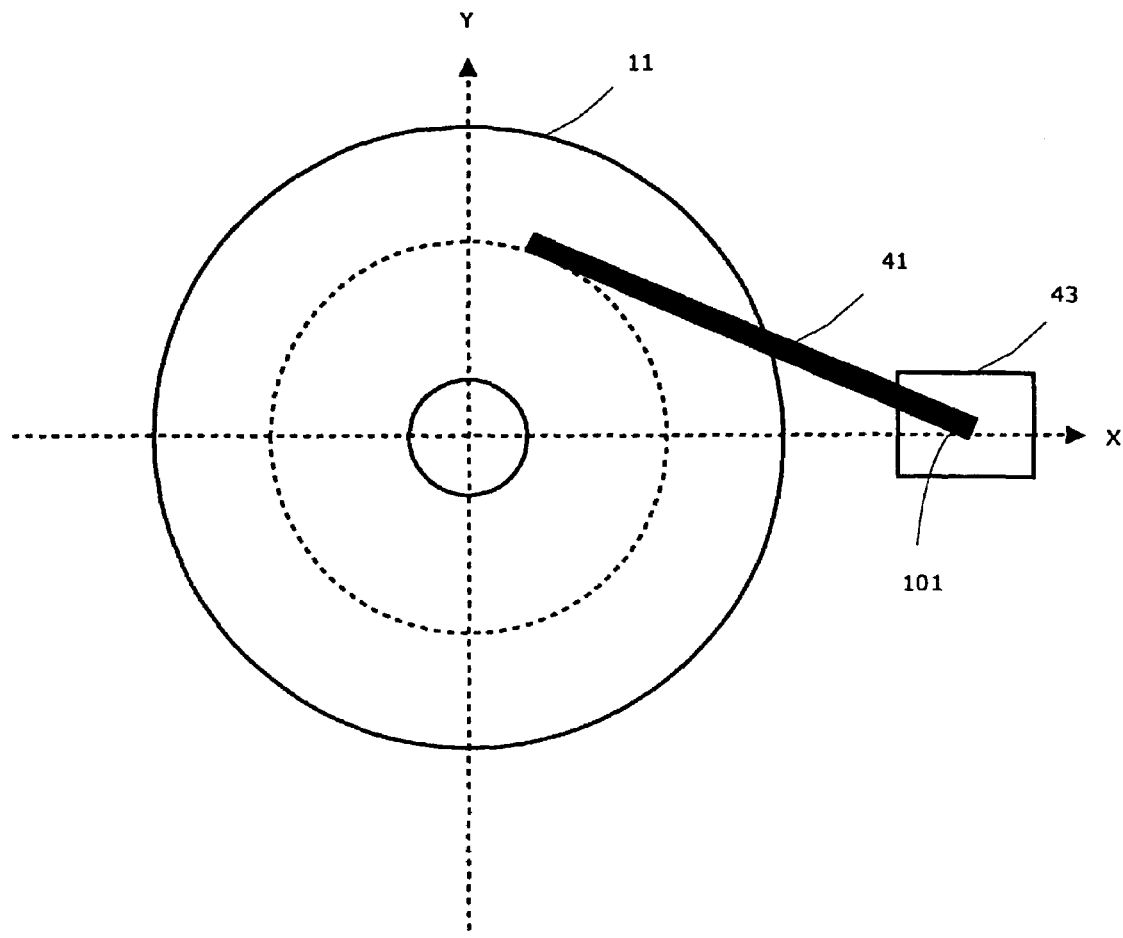
FIG. 4a illustrates one embodiment of the device according to the invention.

FIG. 4a illustrates an embodiment of the device according to the invention with one access unit 41 which is preferably an arm unit. In this embodiment the read beam and write beam is controlled along the arm 41 pivoting on one end the pivot point 101 three-dimensionally as described earlier. The arm unit is run by a small-size and low-weight motor 43. According to this embodiment the read beam is guided and bended to meet the optical storage medium 11 in transversal angle, and the write beam is guided and bended perpendicular to the optical storage medium 11. In association with one arm implementation all the optics set ups described in FIGS. 2a, 2b, 3a and 3b may be used. This arrangement enables simultaneous read and write operation. It also enables very fast random access time for read operation even if write operation is slower.

Figure 4B:
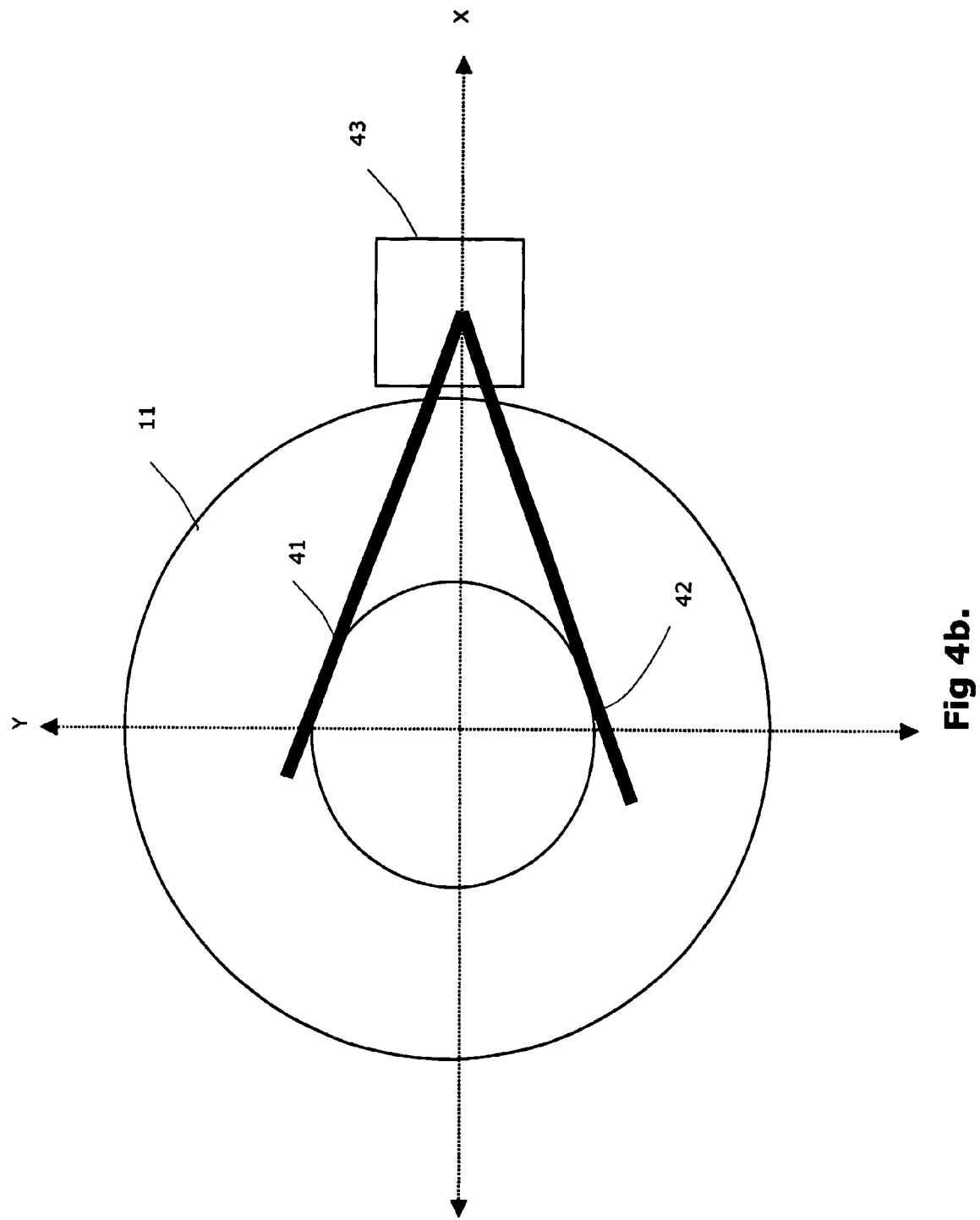
FIG. 4b illustrates another embodiment of the device according to the invention.

FIG. 4b illustrates an embodiment of the device according to the invention with double-arm unit. In this embodiment the read beam is controlled along the first arm 41 and the write beam is controlled along the second arm 42. Both arms pivot on one end of the pivot point 101 three-dimensionally. According to this embodiment the read beam is guided and bended to meet the optical storage medium 11 in transversal angle, and the write beam is guided and bended transversal or perpendicular to the optical storage medium 11. In association with double-arm implementation all the optics set ups described in FIGS. 2a, 2b, 3a and 3b may be used. This arrangement enables simultaneous read and write operation. It also enables very fast random access time for read operation even if write operation is slower. The double-arm unit also enables to use separate read-only drives and read/write drives, analogously to existing CD and CD-R drives. The double-arm solution, however, adds some weight to the device, but the extra mass can be minimized by sharing some functions of the motor 43 e.g. by the gear system so that it is not necessarily required to include two separate motors for both arms. The arms can be synchronized mechanically to provide more symmetric read and write operation.

Figure 4C:
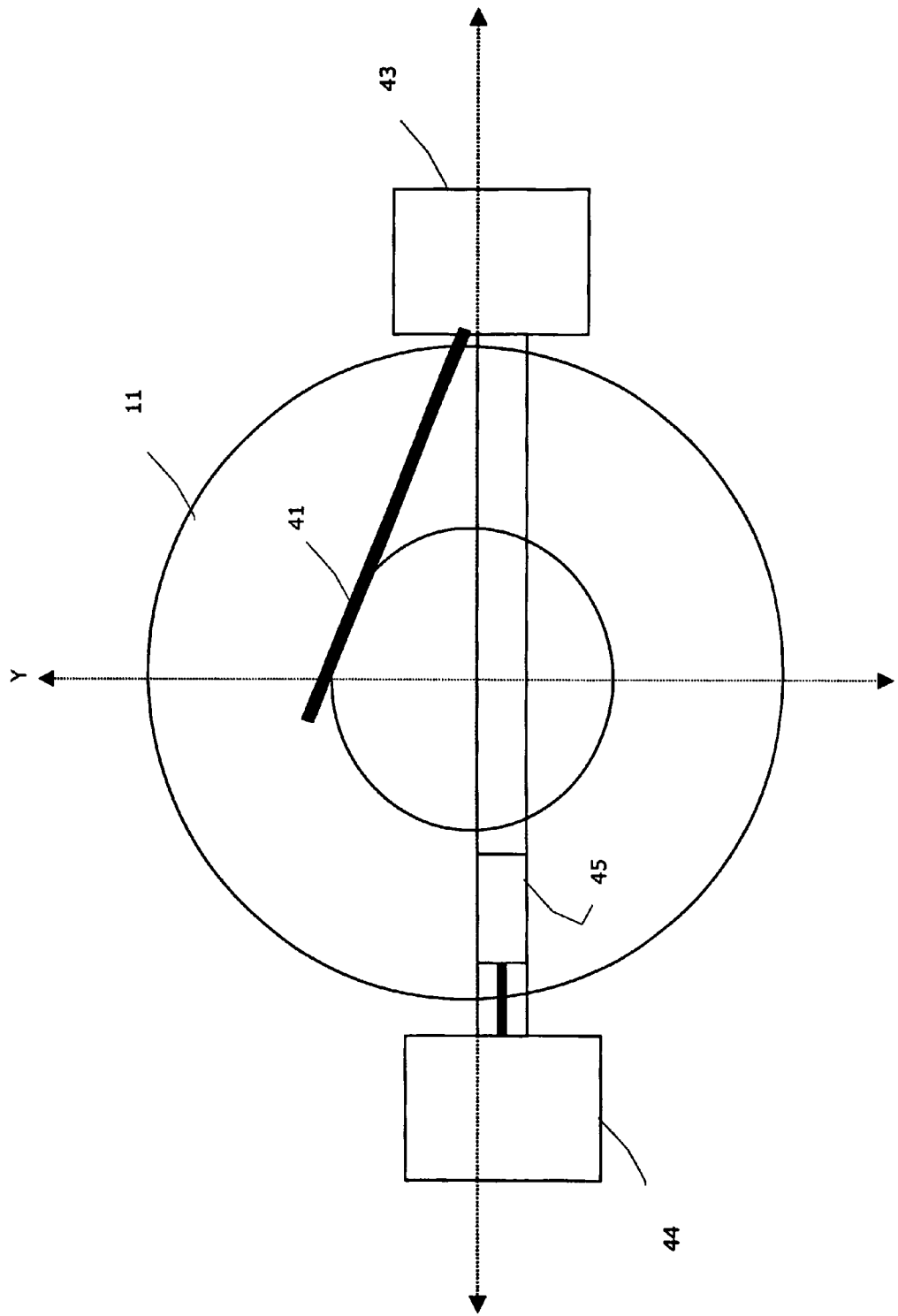
FIG. 4c illustrates still another embodiment of the device according to the invention.

Still a further embodiment of the device according to the invention is illustrated in FIG. 4c. Here, a traditional sledge unit 45 is used in association with the arm unit 41 as access units according to one embodiment of the invention. In this embodiment the read beam is guided and bended to meet the optical storage medium 11 in transversal angle by the arm unit 41, and the write beam is guided and bended perpendicular to the optical storage medium 11 by the sledge unit 45. The arm unit pivots on one end the pivot point 101 three-dimensionally. This embodiment adds more weight to the device than the one-arm unit depicted in FIG. 4a and the double-arm unit depicted in FIG. 4b, because separate motors 43, 44 are needed for the sledge unit 45 and arm unit 41. Although the motors 43, 44 may be integrated in one module, their functionality is different. The embodiments shown in FIGS. 4b and 4c are not regarded the best mode of the invention, because they add weight, cost and complexity to the device and the write operation uses traditional optical pick-up units (OPU) as shown in FIG. 4c with their problems described in the background of the invention.

Figure 5:
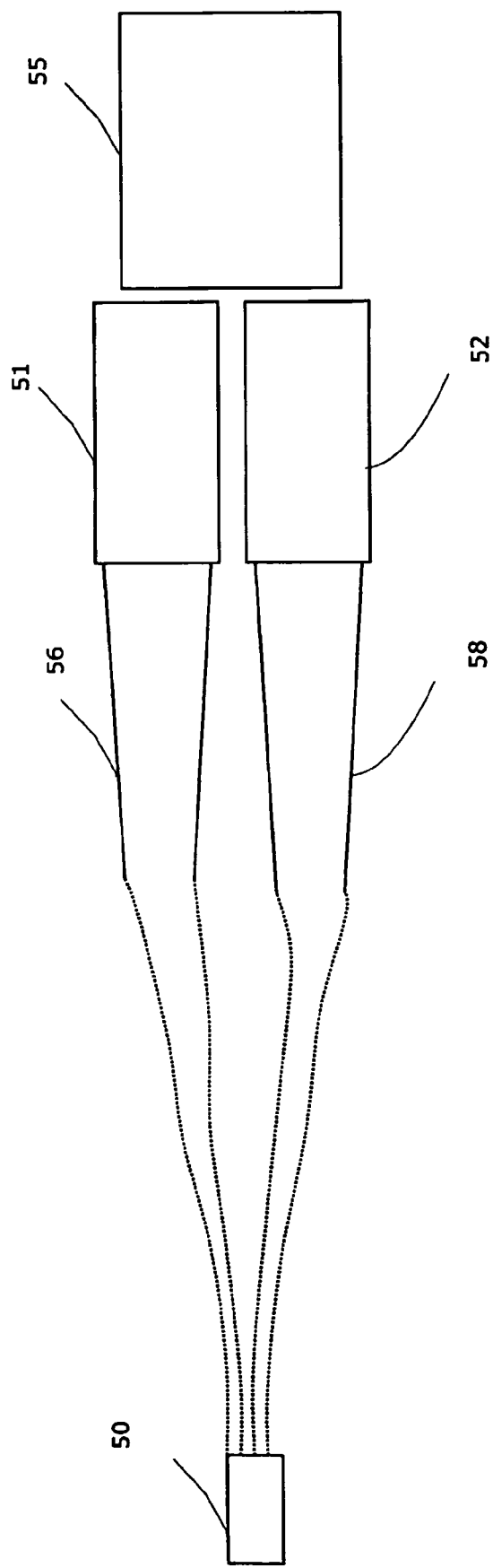
FIG. 5 illustrates an embodiment of using two separate light sources according to the present invention.

FIG. 5 illustrates an embodiment of the present invention, where separate light beams or beam paths 56, 58 are produced by two separate light sources 51, 52. The light beam paths 56, 58 are guided according to the invention to the access unit 50 as described earlier in this description. In this embodiment the separate light sources 51, 52 are synchronized by the synchronization means 55 to insure high level of precision in read/write operation. A flow diagram of the simplified algorithm for the embodiment with separate light sources embodiment is described in FIG. 10a and a flow diagram of another algorithm for the embodiment with separate light sources is described in FIG. 10b.

In the following the detection of the focusing and tracking signals is described. The light beam is transmitted from the light source along an pivoting arm which is capable of being controlled three-dimensionally in relation to its pivot point. This means that the pivoting arm moves in up-and-down, lateral and longitudinal (rotational related to axis of revolution) directions, i.e. it pivots on in relation to x-, y- and z-axis. This arrangement ensures that the light beam follows the data track transversal to the surface of optical storage medium in the direction of propagation but accurately perpendicular to the surface of the optical storage medium in lateral direction. A push-pull movement of the access unit keeps the z axis perpendicular to the surface of the optical storage medium.

The combination of using transversal light beam to be directed to and reflected from the optical storage medium and the use of the moving arm provide simple focusing and tracking capability, because focusing and tracking signals can be identified by following the change in the optical intensity distribution of the reflected light beam. Realiable operation and fast random access times are achieved by the simultaneous transversal light beam focusing and simultaneous read and/or write operation.

The signal processing method relies on the existence of several orders of diffracted light. The reflected light beam is separated into sub-beams, called diffraction orders and assigned by their ordinal numbers starting from the central beam (diffraction order=0) and appended by plus or minus sign on the repective sides of the central beam (×1, +1, etc.). The central beam (the thick arrow 1b, 1b' in FIGS. 7b and 7c) is the zero-order diffraction, corresponding to ordinary geometric reflection. In the first approximation, geometric optics can be used to analyze the behavior of this order (FIGS. 6a-6e). Analysis of the side orders (the thin lines 1a, 1c, 1a', 1c', 1c" in FIGS. 7b, 7c) requires optical modelling where the diffraction is taken into account. However, again as a first approximation, geometric optical modelling has been used to trace the location of the central peak of the diffracted orders. The central beam and side orders together form the so-called "baseball pattern" (FIGS. 7g-7k) known in prior art.

Figure 6C:
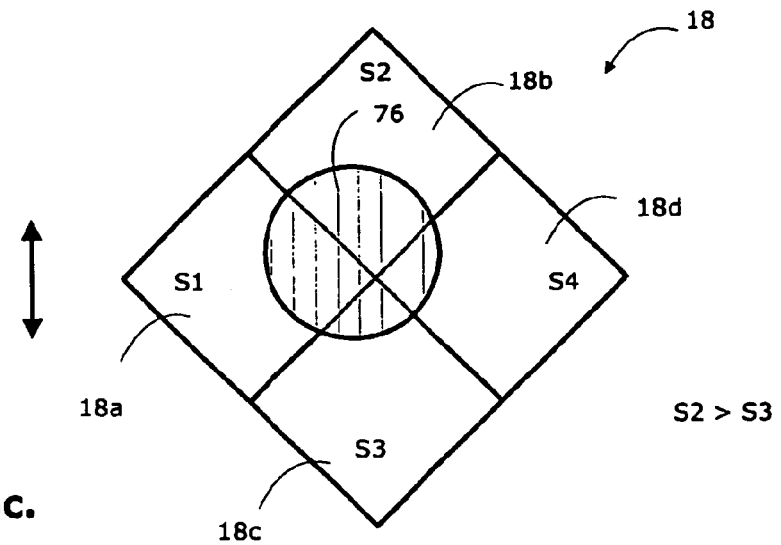
FIG. 6c illustrates a fundamental idea of a focusing signal identification of the device according to the invention.
Figure 6D:
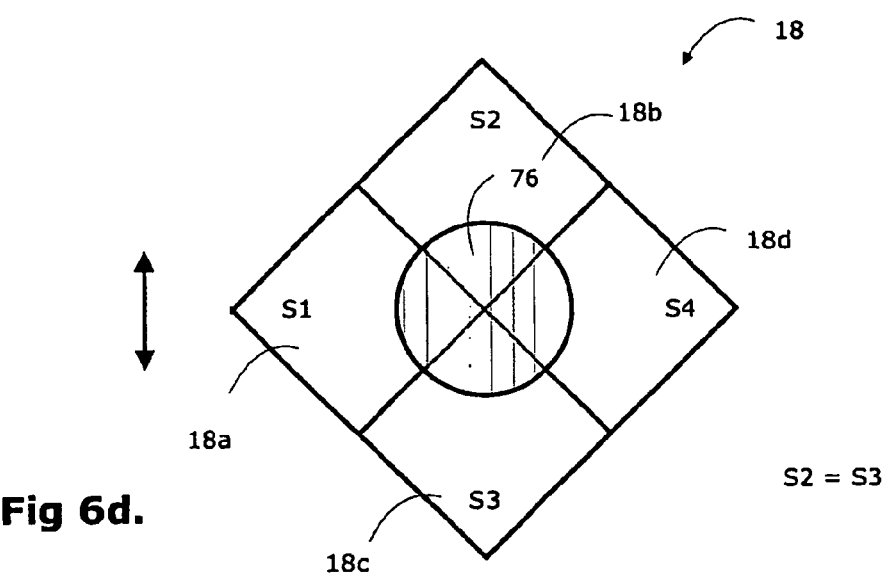
FIG. 6d illustrates a fundamental idea of a focusing signal identification of the device according to the invention.
Figure 6E:
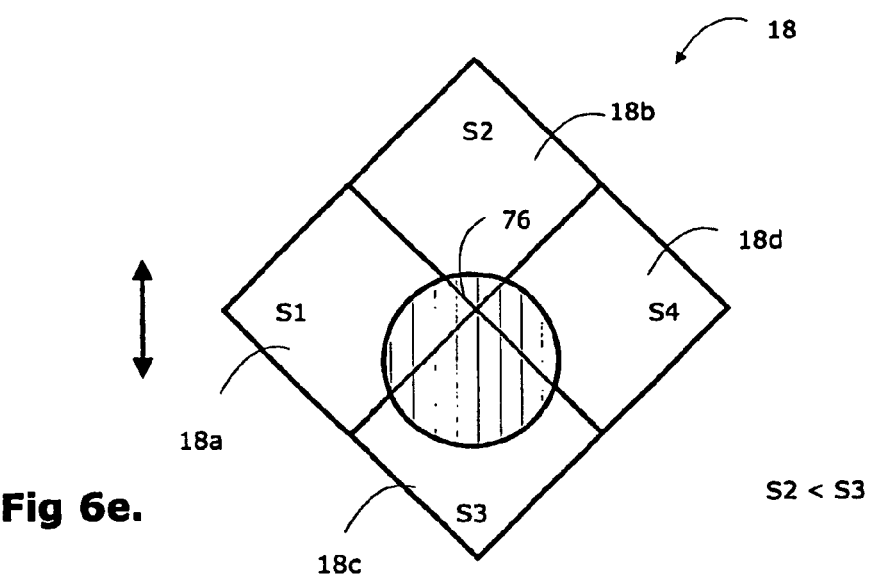
FIG. 6e illustrates a fundamental idea of a focusing signal identification of the device according to the invention.

FIGS. 6a and 6b illustrate the fundamental idea of the focusing signal detection of the device according to the invention. A detector element 18 which may preferably be a quad detector with four detector surfaces 18a, 18b, 18c and 18d is depicted in FIGS. 6c-6e (and 7d-7f). In FIG. 6a the access unit 10, preferably the arm unit, moves relative to the optical storage medium 11 as needed to keep the light beam in focus. FIG. 6b shows an optical element e.g. a lens 16 which bends the light beam transversal towards the optical storage medium, and a detector element 18 with at least two surface elements. More detectors and detectors with different geometries may also be used. According to the invention the optical element 16 and the detector element 18 are arranged to move along the arm unit 10 with appropriate fastening means. In consequence of the moving arm the movement of the optical element 16 toward or away from the optical storage medium will move the spot location A, B, C on the detector element 18 according a distance between the optical storage medium 11 and the optical element 16. The points A', B', C' are spot locations of the beams on the optical storage medium, respectively. In FIG. 6b the spot location A (and A') shows the situation when the reflected light beam is in focus on the surface of the optical storage medium 11. Correspondingly the spot location B (and B') shows that optical storage medium 11 is too close to the detector (above focus) and the spot location C (and C') shows that it is too far from the detector (below focus). The light beam may optionally be guided to the detector element 18 with an optical element (e.g. FIG. 2a part 28) or a diffractive optical element (e.g. FIG. 2a part 27) in front of the detector.

The detection by identifying the focusing signal to control the movement of the arm unit is described next in association with FIGS. 6c, 6d and 6e. These figures illustrate a detector element 18, preferably a quad detector with four detector surfaces 18a, 18b, 18c, 18d. A track direction is shown by an arrow. For example, a collimated circular light beam can be emitted and then be focussed on the data layer by a diffractive optical element. The reflected light beam is then collimated or focused on the detector by the diffractive optical element. The reflected light beams from the surface of the optical storage medium are received by the quad detector 18 which four surface areas 18a, 18b, 18c and 18d responding to light intensity signals S1, S2, S3 and S4, respectively. FIGS. 6c, 6d, 6e shows if one received reflected light beam is in focus or not. The intensity distribution and the shape of the spot on the detector 18 varies at various positions of the optical strorage medium. The focus is determined by the location of the central reflected beam along the top-bottom direction of the quad detector. (There are additional diffracted orders that appear as side spots. Since these are used in the tracking detection, they have been eliminated from this figure; in principle they only add extra calibrating factors to the focus push-pull algorithm). In FIG. 6c a focusing signal aligns to the spot 76 which covers an area where the surface area S2 is much larger than the surface area S3. This means that the reflected light beam is above focus and the detector element is arranged to control the access unit to move downwards. In FIG. 6d a focusing signal aligns to the 76 which covers an area of the detector surfaces where the signals S2 and S3 are equal. This means that the reflected light beam is in focus and any correction is not needed and thus the detector element is arranged to control the access unit to stand still. Finally, in FIG. 6e a focusing signal aligns to the spot 76 which covers an area where the signal S2 is much smaller than the signal S3. This means that the reflected light beam is below focus and the detector element is arranged to control the access unit to move upwards. The baseball pattern on the surface of the detector is moving in accordance with changed focus.

Figure 7A:
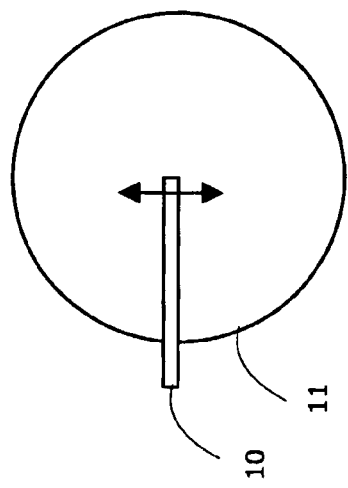
FIG. 7a illustrates a fundamental idea of a tracking signal detection of the device according to the invention.
Figure 7C:
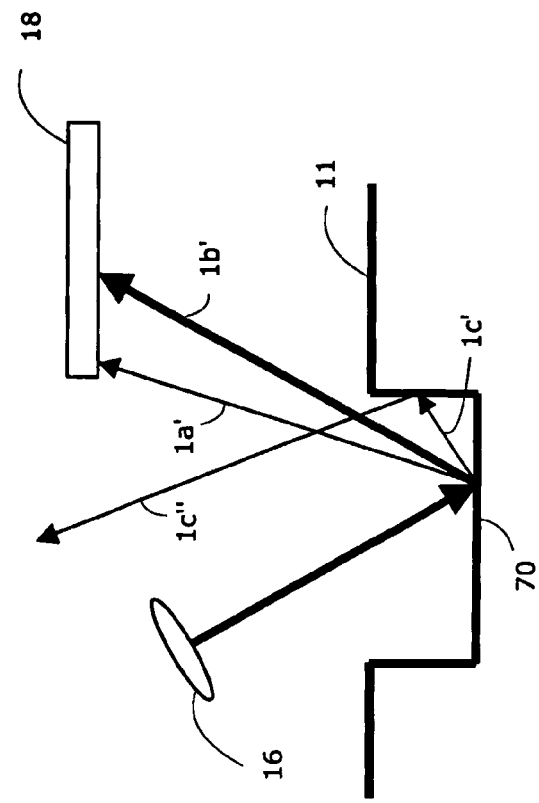
FIG. 7c illustrates a side view of a fundamental idea of a tracking signal detection of the device according to the invention.
Figure 7B:
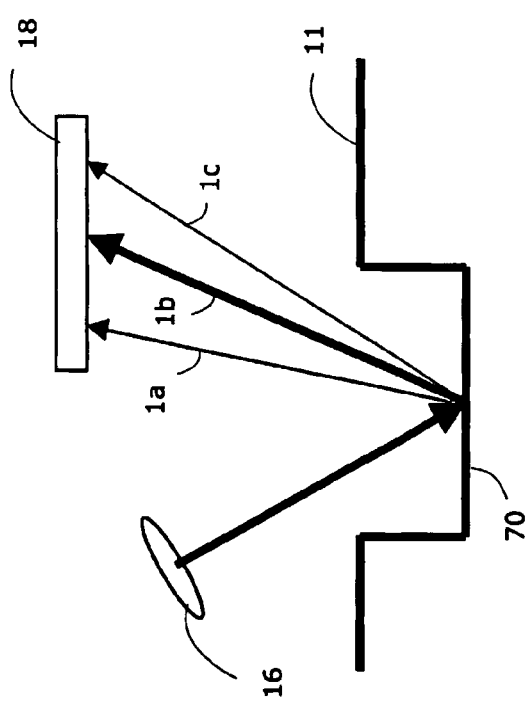
FIG. 7b illustrates a side view of a fundamental idea of a tracking signal detection of the device according to the invention.

FIGS. 7a, 7b and 7c illustrate a highly simplified schematic of the fundamental idea of the tracking of the device according to the invention. A more realistic schematic is shown in FIGS. 7g-7k. FIGS. 7a-7f show an intuitive representation of one embodiment of the basic concept. In FIG. 7a the access unit 10, preferably the arm unit, moves in lateral direction in relation to the optical storage medium 11 to keep the light beam on track. FIGS. 7b and 7c show a lens 16 which forms a focused beam that on reflection creates two orders of diffraction around the central beam. In a geometrical approximation, these can be modelled as beams 1 travelling towards the data track 70 of the optical storage medium 11. Each beam is then reflected towards a detector element 18 with at least two, preferable four, surface elements for analysing tracking. The reflected central beam in FIG. 7b is 1b and in FIG. 7c 1b'.

Respectively, the reflected diffracted beams are 1a, 1c and 1a', 1c'. FIG. 7b shows a situation when the light beam is on track (diffracted orders −1, 0, +1) and FIG. 7c shows an off track situation where the light beam 1c' is reflected from the edge (beam 1c") of the data track 70.

Figure 7D:
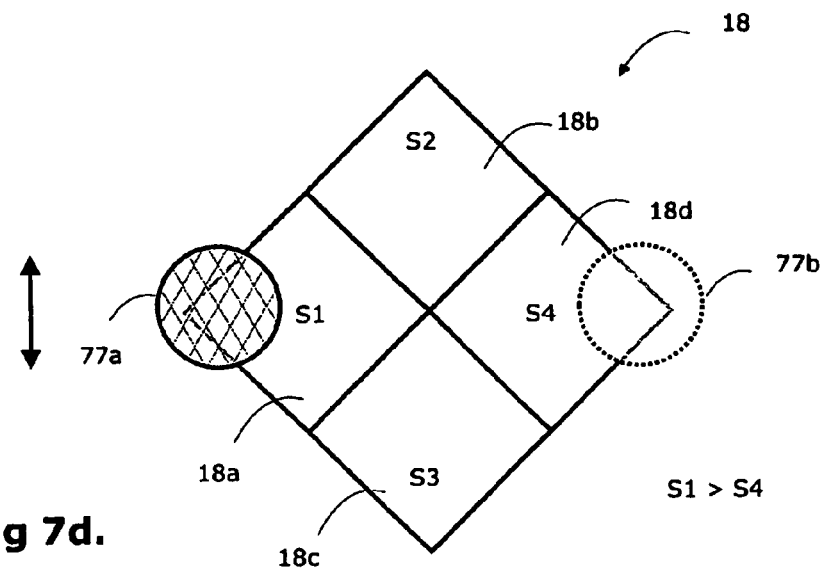
FIG. 7d illustrates a simplified fundamental idea of a tracking signal identification of the device according to the invention.
Figure 7E:
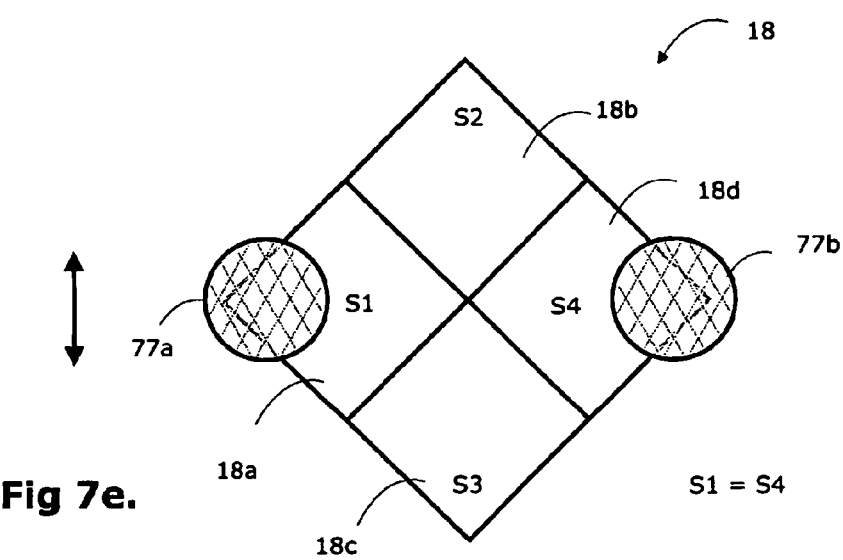
FIG. 7e illustrates a simplified fundamental idea of a tracking signal identification of the device according to the invention.
Figure 7F:
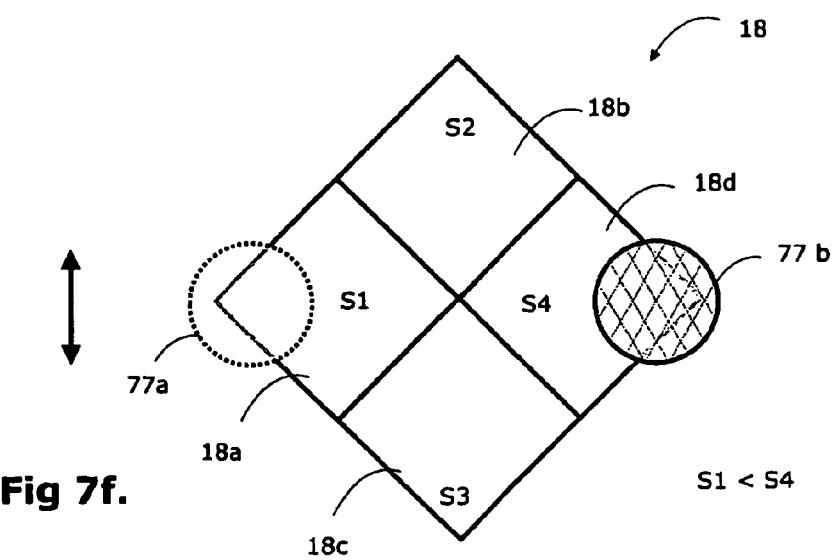
FIG. 7f illustrates a simplified fundamental idea of a tracking signal identification of the device according to the invention.

The detection by identifying the tracking signal to control the movement of the arm unit according one simplified embodiment of the invention is described next in association with FIGS. 7d, 7e and 7f. These figures illustrate a detector element 18, preferably a quad detector with four detector surfaces 18a, 18b, 18c, 18d. A track direction is shown by an arrow. For example, a circular collimated light beam 1 can be focussed on the data layer by a diffractive optical element. The reflected light is then collimated or focused on the detector by the diffractive optical element. The tracking signal is detected by the detection element 18. The spot locations of the reflected beams form a baseball pattern on the four surfaces of the detector. The intensity distribution and the shape of the spot on the detector 18 varies at various positions of the optical storage medium. By comparing the intensities received by e.g. two quadrants, e.g. surfaces 18a and 18d locating at opposite sides of the track, the tracking characteristics can be identified. The reflected light beams (FIG. 7b beams 1a, 1b, 1c) from the surface of the optical storage medium are received by the quad detector 18 which four surface areas 18a, 18b, 18c and 18d responding to light intensity signals S1, S2, S3 and S4, respectively. For example, in FIGS. 7d, 7e and 7f two reflected light beams are detected and identified. In case of the off track situation, the baseball pattern becomes asymmetric according to FIGS. 7d and 7f. In FIG. 7d the light intensity of the spot 77a is higher on the area of the detector surface 18a than the intensity of the spot 77b on the surface 18d, corresponding to signal S1 being higher than signal S4, which means that the light beam is to the left of the track. This results that the detector element 18 is arranged to control the access unit to move to the right. In FIG. 7f the intensity of the spot 77b is higher on the area of the detector surface 18d than the spot 77a on 18a, corresponding to signal S4 being higher than signal S1, which means that the light beam is to the right of the track. This results that the detector element 18 is arranged to control the access unit to move to the left. In FIG. 7e intensities of the spots 77a and 77b are equal in the surface area 18a and 18d, corresponding to signal S1 being equal to signal S4, and thus the light beam is on track. No correction is needed and thus the detector element is arranged to control the access unit to stand still. The baseball pattern on the surface of the detector is moving in accordance with changed tracking.

The details of the reflected spot and baseball pattern will differ somewhat from the idealized situation described above; for example, rather than staying exactly circular, the central focused beam will be deformed when it is above or below focus. In addition, it is necessary to use a more realistic diffraction model (described below) to describe the readout mechanism more realistically. The method shown above works well as a qualitative first approximation. When the push-pull mechanism of the arm unit is used, these irregularities are not critical; the system aims to keep the system in that configuration in which the central spot is focused on the center of the quad detector and the side baseball patterns are symmetrical. At worst, the irregularities may require adjustments to the sensitivity of the push-pull mechanism in different directions, and also some asymmetric calibration of the signals from the quad detectors (which can be done trivially in the signal-processing electronics). Similarly, the detector may become slightly misaligned from the track because of the motion of the arm; this can be corrected for by similar calibrations or in some cases even ignored.

A more physically accurate presentation of the readout scheme utilizing a more realistic diffraction model is now shown. The detection by identifying the tracking signal to control the movement of the arm unit according to this embodiment of the invention is described next in association with FIGS. 7g-7k.

Figure 7G:
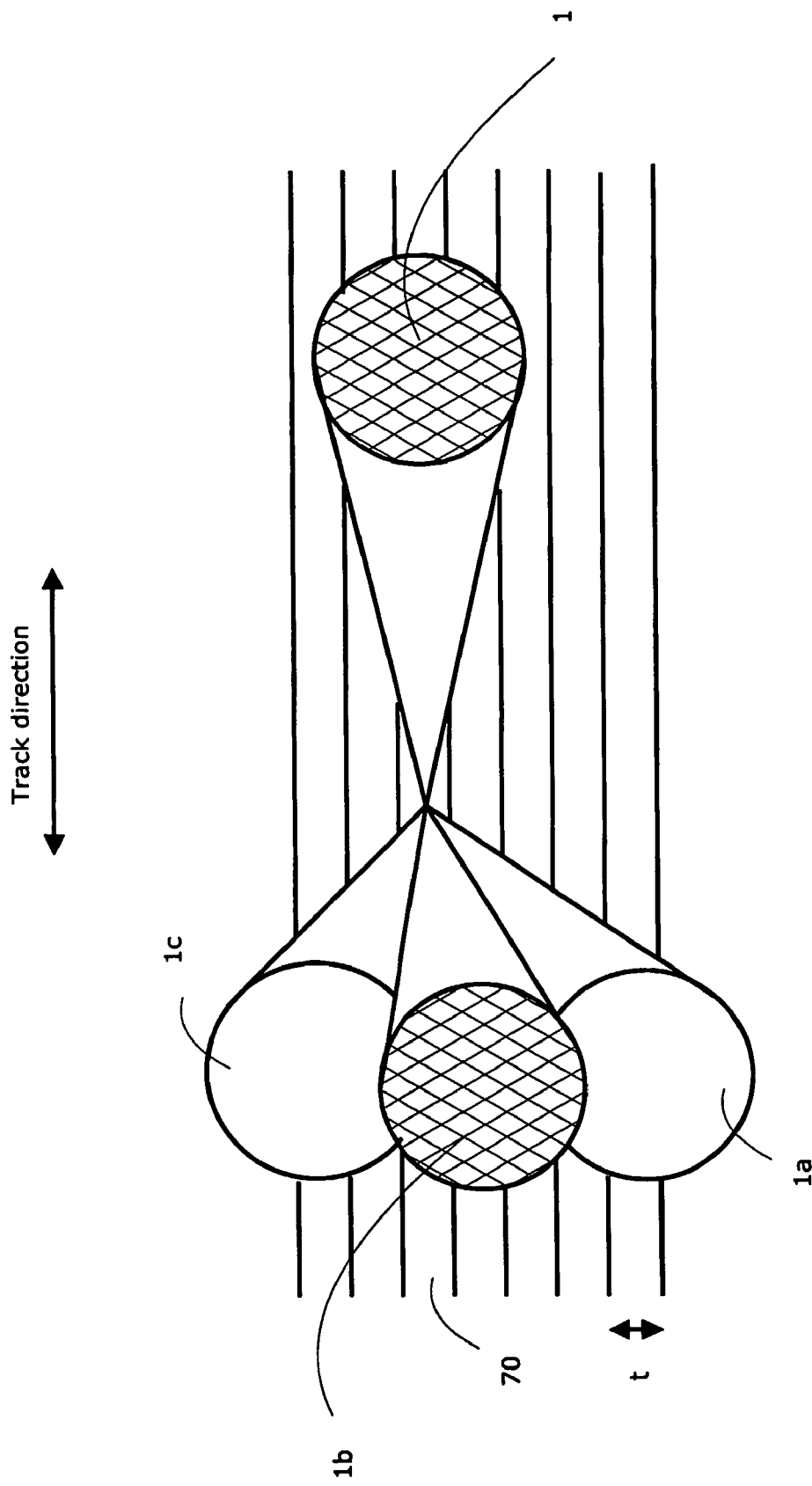
FIG. 7g illustrates a top view of a fundamental idea of a tracking signal identification of the device according to the invention.
Figure 7H:
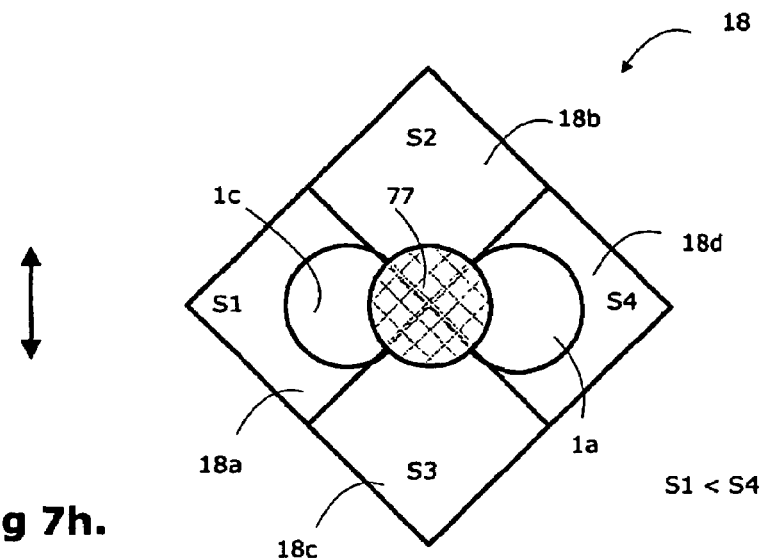
FIG. 7h illustrates a fundamental idea of a tracking signal identification of the device according to the invention.
Figure 7I:
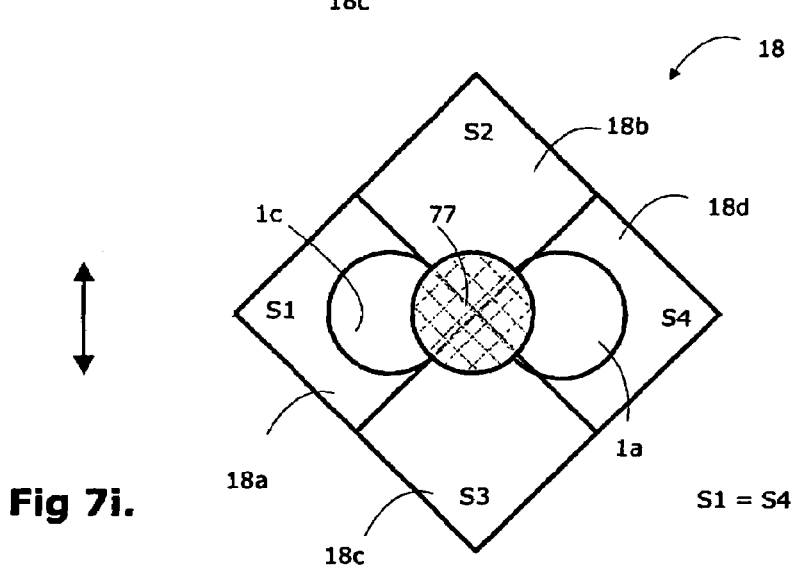
FIG. 7i illustrates a fundamental idea of a tracking signal identification of the device according to the invention.
Figure 7J:
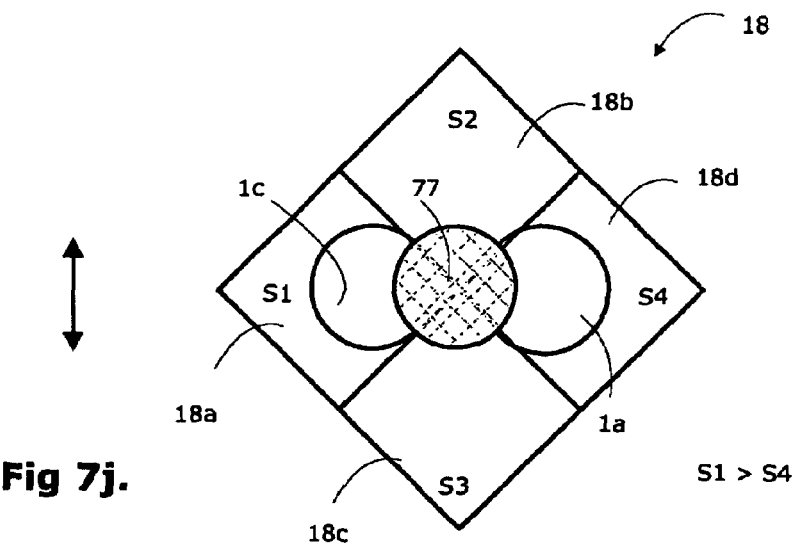
FIG. 7j illustrates a fundamental idea of a tracking signal identification of the device according to the invention.

The tracks of the data layer are forming a periodical structure which functions as a reflection grating as shown in FIG. 7g, which is a top view of FIG. 7b. FIG. 7g illustrates tracks 70 and the grating period t depicted as the track separation. This grating is separating the incoming beam 1 into sub-beams 1a, 1b and 1c, which are called diffraction orders, and assigned by their ordinal numbers starting from the centre beam 1b and appended by minus sign 1a or plus sign 1c on the respective sides of the centre beam. FIG. 7g shows three diffraction orders from −I to +I, where I is 1, 2, 3, etc. The tracking signal is generated by taking the advantage of the interference between the $0^{th}$ (reflected centre beam 1b) order and ±Ith order, which changes the intensities received by the quadrants 18a and 18d as shown in FIGS. 7h-7j. It should be noted here that the coherent light is used and so the intensities of the overlapping orders cannot be simply added together, instead the interference between the orders must be taken into account when calculating the overall intensities of the quadrants.

FIGS. 7h-7j illustrate a detector element 18, preferably a quad detector with four detector surfaces 18a, 18b, 18c, 18d. A track direction is shown by an arrow. A tracking signal is used to follow the data tracks during the playback of the optical storage medium. One method to produce the tracking signal in an access unit is to compare the light intensities received by two guadrants of the detector element 18, assigned with detector surface 18a responding to the signal S1 and detector surface 18d responding to the signal S4, where 18a and 18d are located at the opposite sides of the track. In general a geometry of the optical storage medium defines in which one of the two quadrants the intensity is increasing and decreasing when the spot is focussed on the side of the track. The +Ith orders are partly overlapping with the 0th orders as shown in FIGS. 7h-7j, as well as in FIG. 7g, and are forming a baseball pattern on the detector element 18. FIG. 7i shows a situation when the spot 77 is focused in the middle of the track. Then signals S1 and S4 in the quadrants 18a and 18d, respectively, are equal because the situation is symmetrical and so the interference of the $0^{th}$ order with the −Ith and +Ith order is identical. Now if the spot 77 is focussed on the side of the track it changes the phases of the reflected sub-beams 1a or 1c on the detector. Depending on the structure of the optical storage medium, and on which side of the track the beam is, either −Ith or +Ith order is interfering constructively with the $0^{th}$ order, i.e. the light intensity in that quadrant is increasing. The other order is interfering destructively with the $0^{th}$ order and so the light intensity in that quadrant is decreasing. Consequently, as shown in FIG. 7h, the destructive interference in the quadrant 18a gives lower signal than the constructive interference in the quadrant 18d, which means that the intensity signal S4 is higher that the intensity signal S1, and hence the light beam is to the left of the middle of the track. Correspondingly, as shown in FIG. 7j, the constructive interference of the quadrant 18a giving higher signal than the destructive interference of the quadrant 18d, which means that the intensity signal S1 is higher than the intensity signal S4, and hence the light be is to the right of the middle of the track. The magnitude of the constructive and destructive interference, and thus the signal, in the quadrants of the detector is proportional to the spot's 77 distance from the track causing a signal that varies in the function of the distance. The imbalance of the quadrant intensities can be detected and used to generate the tracking signal needed to keep the beam focussed on the track.

Figure 7K:
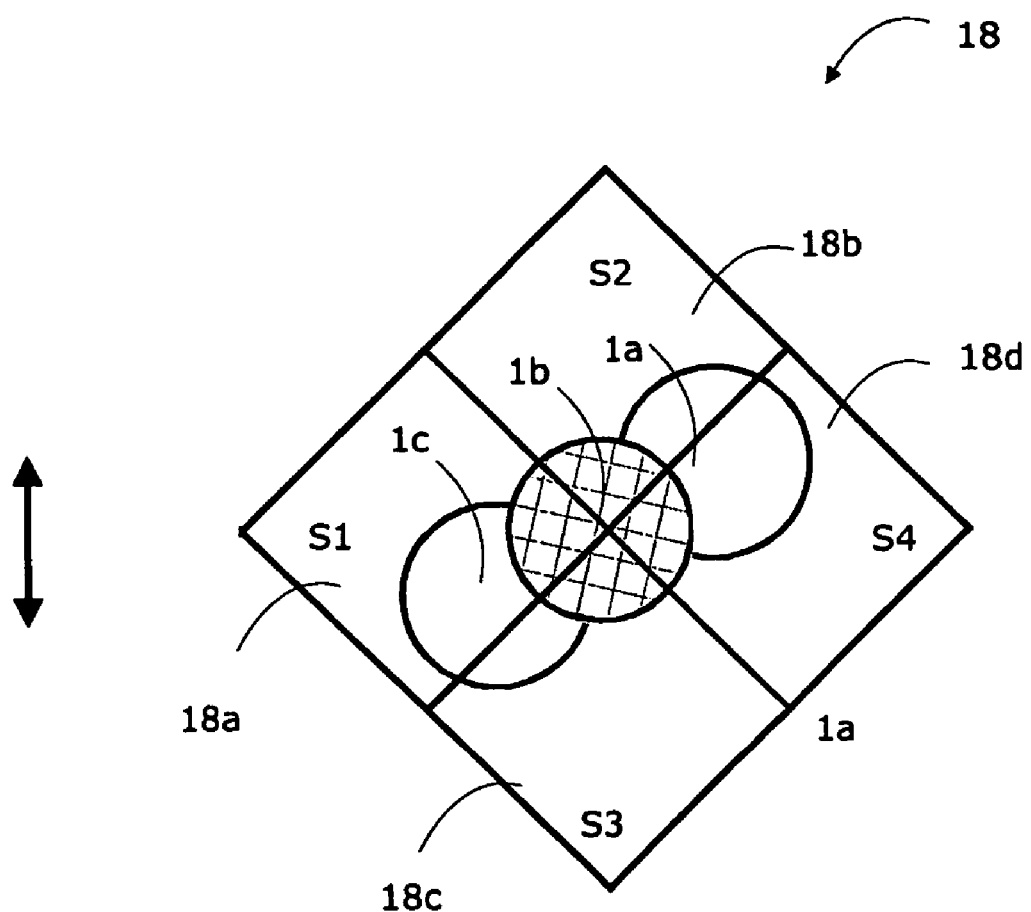
FIG. 7k illustrates a fundamental idea of a tracking signal identification of the device according to the invention.

The rotation of the access unit, preferably an arm unit, changes the alignment of the detector and the tracks and the system must be able to tolerate this. The misalignment can be optimised to be less than 10 degrees and the system can be designed to tolerate this. The misalignment is changing the intensity distribution on the detector symmetrically as shown in FIG. 7k. The equal areas of the spots and thus intensities of the +Ith and −Ith orders are shifted from the quadrants 18a and 18d to the quadrants 18b and 18c. Due to this the relative intensities between the quadrants 18a and 18d, used to calculate the tracking signal, and relative intensities between the quadrants 18b and 18c, used to calculate the focusing signal, are not changing and the signals can be calculated as usual. In FIG. 7c the misalignment is exaggerated and normally will be less than 10 degrees in accordance with tests performed.

In the preferred embodiment, the same light beam is used to provide both the focusing and tracking signals. Also three-beam or multi-beam or other types of steering may be used to provide the focusing and tracking signals. The device of the invention is not highly sensitive to the angle error caused by movement of the access unit, because the baseball pattern is simply slightly rotated.

The focusing and tracking signals can be studied by simulations, such as functional electric simulation signal calculations, by using e.g. a quad detector element with four surface elements. A detailed calculation of the actual signals and the sensitivities and calibrations needed to perform the push-pull operation requires diffractive modelling rather than the simplified geometric model shown here. However, adding diffraction to the model affects only the detailed results and not the fundamental principle. Note that in a real system there may be additional optical phenomena not covered here such as additional diffraction from the edges of the groove; since these are second-order phenomena, they are likely to be insignificant. In cases where they are not, they can be handled by additional signal processing; the specific signal processing depends on the details of the particular embodiment, and is not covered here.

Figure 8:
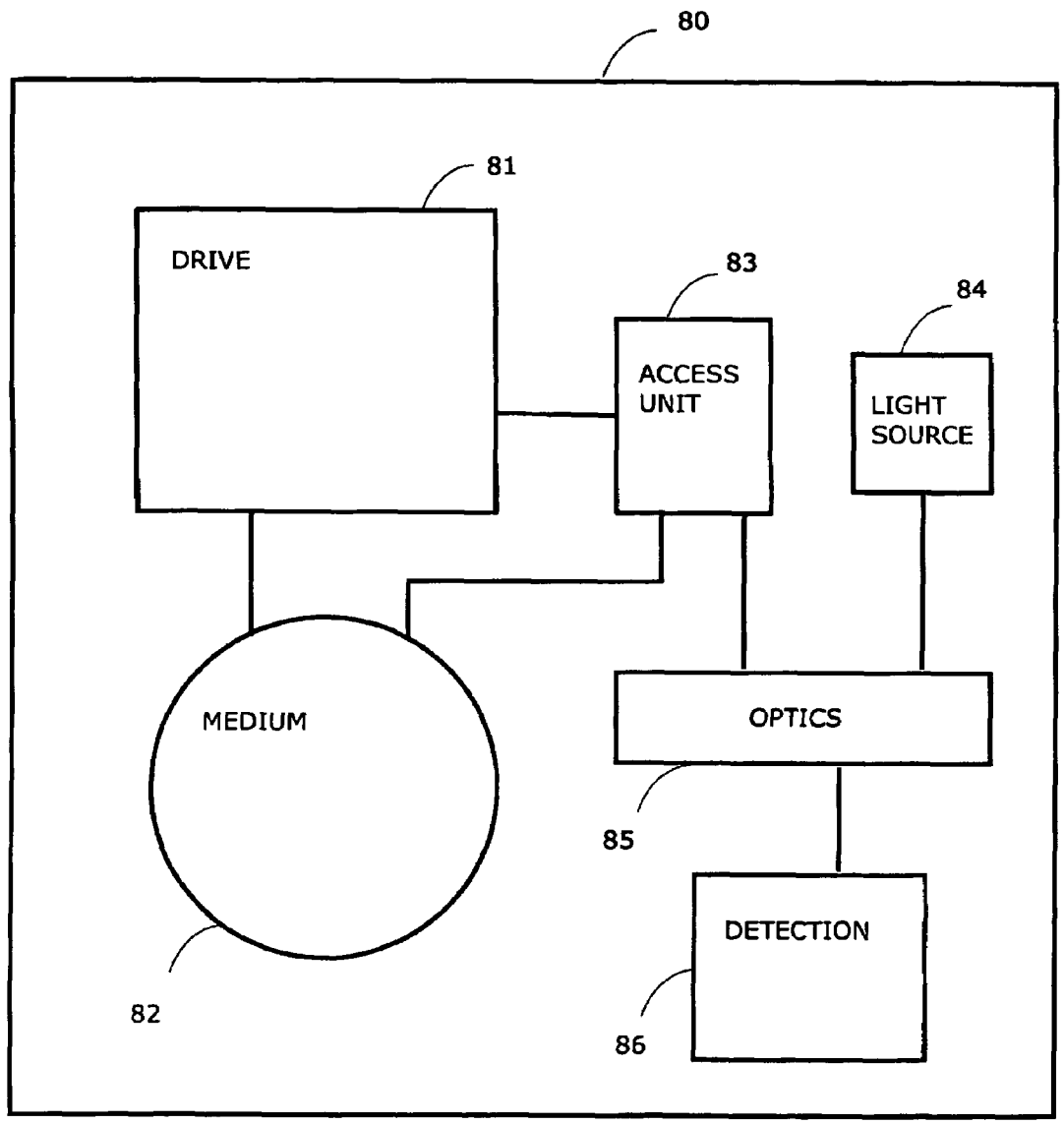
FIG. 8 illustrates a block diagram of a communication device according to the invention.

FIG. 8 illustrates a communication device 80 comprising an optical storage medium drive 81 and at least one access unit 83 for reading out data from an optical storage medium 82 and for writing data to an optical storage medium 82 according to the invention. The communication device also comprises at least one light source 84 for emitting light beams, optical components 85 for transmitting, guiding, bending and focussing the light beams and a detector element 86 for detecting the reflected light beams. Light sources 84, e.g. semiconductor lasers, are used to provide light beams needed to read and write data from/to the optical storage medium 82. When the light beam is emitted from the light source it may diverge, i.e. the emitted light beam widens. In order to transfer enough light from the light source to the desired distance optical components 85 are used to restrict the widening of the light beam. As well, optical components 85 are used to collimate or focus the emitted light beam. The collimated light beam can be used to propagate the beam long distances in free space and the focusing can be used to image the beam into a lightguide or wave-guide. Also optical components 85 are used to redirect and focus the light beam to the data track of the optical storage medium. In front of the detector optical components 85 are used to collect the reflected light beam to the detector element. These optical components, here just referred by a number 85, are discussed more detail in connection with FIGS. 1a, 1b, 2a, 2b, 3a and 3b.

In FIG. 8, in accordance with shown in FIGS. 1a and 1b, the access unit 83 pivots on its one end (pivot point) three-dimensionally in relation to vertical (x), horizontal (y) and longitudinal (z) axis. Thus the access unit is capable of being controlled at least in upwards-downwards, lateral and tilted direction in relation to its pivot point. The access unit 83, optical components 85 and the detector element 86 for receiving and detecting the reflected light beam are the same as described in association with FIGS. 1a, 1b, 2a and 2b. They are arranged so that they move in accordance with the movement of the access unit, i.e. they are fixed to the access unit with appropriate fastenings means. The units 84 and 86 are also connected electrically to the access unit 83 and a main control unit (not depicted) of the device. The light source 84 is preferably located at or near the pivot point of the access unit. In accordance with the above mentioned set up of the device the light beam emitted from the light source is guided in a transversal angle towards the data tracks of the optical storage medium. The reflected light beam reflected from the data tracks of the optical storage medium is received in a transversal angle by the detector element 86 and associated optical components 85. All the embodiments of the device described earlier in association with FIGS. 1a to 5 are also relevant with the communication device 80 according to the invention. Also the fundamental idea of the focus error correction (FIG. 6) and the track error correction (FIGS. 7a and 7b) are relevant in association with the communication device according to the invention.

According to one further embodiment of the invention the light source 84 may be located at the other end of the access unit than the pivot point, i.e. on the access unit head, and the light beam from the light source is guided in a transversal angle towards data tracks. This implementation reduces still component count, because the mirror 15, 15a (FIGS. 1a and 1b) can be omitted and for focusing the light beam the diffractive optical element DOE 16 (FIGS. 1a and 1b) can be used. However, this implementation requires smaller-size and lower-weight light sources than available by today's technology.

Figure 9:
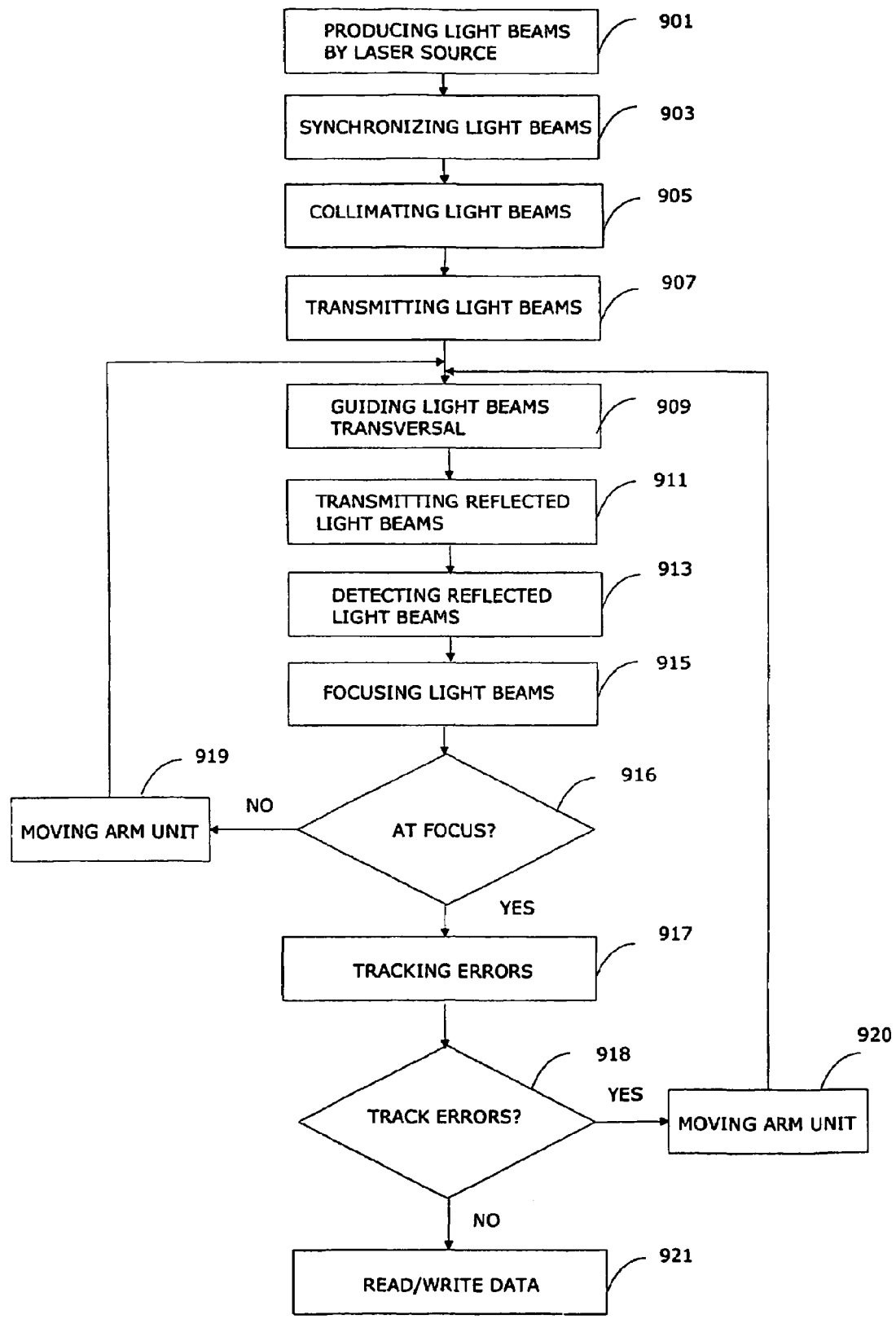
FIG. 9 illustrates a flow diagram of a method according to the invention.

FIG. 9 illustrates a flow diagram of a method according to the present invention for reading out data from an optical storage medium and writing data to an optical storage medium. In the first step 901 the light source produces the light beam. If two or more separate light sources are used, the light beams are synchronized by synchronizing the laser sources according to step 903. The synchronization algorithm used is described later in this description. In step 905 emitted light beams may be collimated before transmitting them in step 907. The emitted light beams are guided and bended transversal towards the tracks of the optical storage medium according to step 909. After this the reflected light beams from the tracks of the optical storage medium are transmitted in step 911 and then the reflected light beams are detected in step 913. The focus error is detected according steps 915 and 916 and if correction is needed, appropriate correction is made by a movement of the access unit according to step 919 and after that steps 909 to 916 are repeated. The track error is detected according steps 917 and 918 and if correction is needed, appropriate correction is made by a movement of the access unit according to step 920 and after that steps 909 to 918 are repeated. When focus and tracking is correct the read and/or write operation using transversal angled light beams is performed according to step 921.

Note that the control in the z-direction has been left out of this definition of the algorithm as not presenting any significant novelty; it is a straightforward push-pull algorithm which keeps the beam correctly aligned by seeking symmetry of the reflected signal. Note also that the sampling frequencies for control in the various directions (x,y,z) may be very different, and as such FIG. 9 is only a highly idealized representation of the actual algorithm (in which sampling in the sampling rates for the x, y, and z directions may be different). However, this idealization adequately presents the significant features of the invention, and the refinements are considered specific embodiments.

It is also possible to derive more complex algorithms based on simultaneous analysis of the various push-pull loops (in the x, y, and z direction). These are considered specific extensions and refinements of the present invention, and are not covered in detail.

Figure 10A:
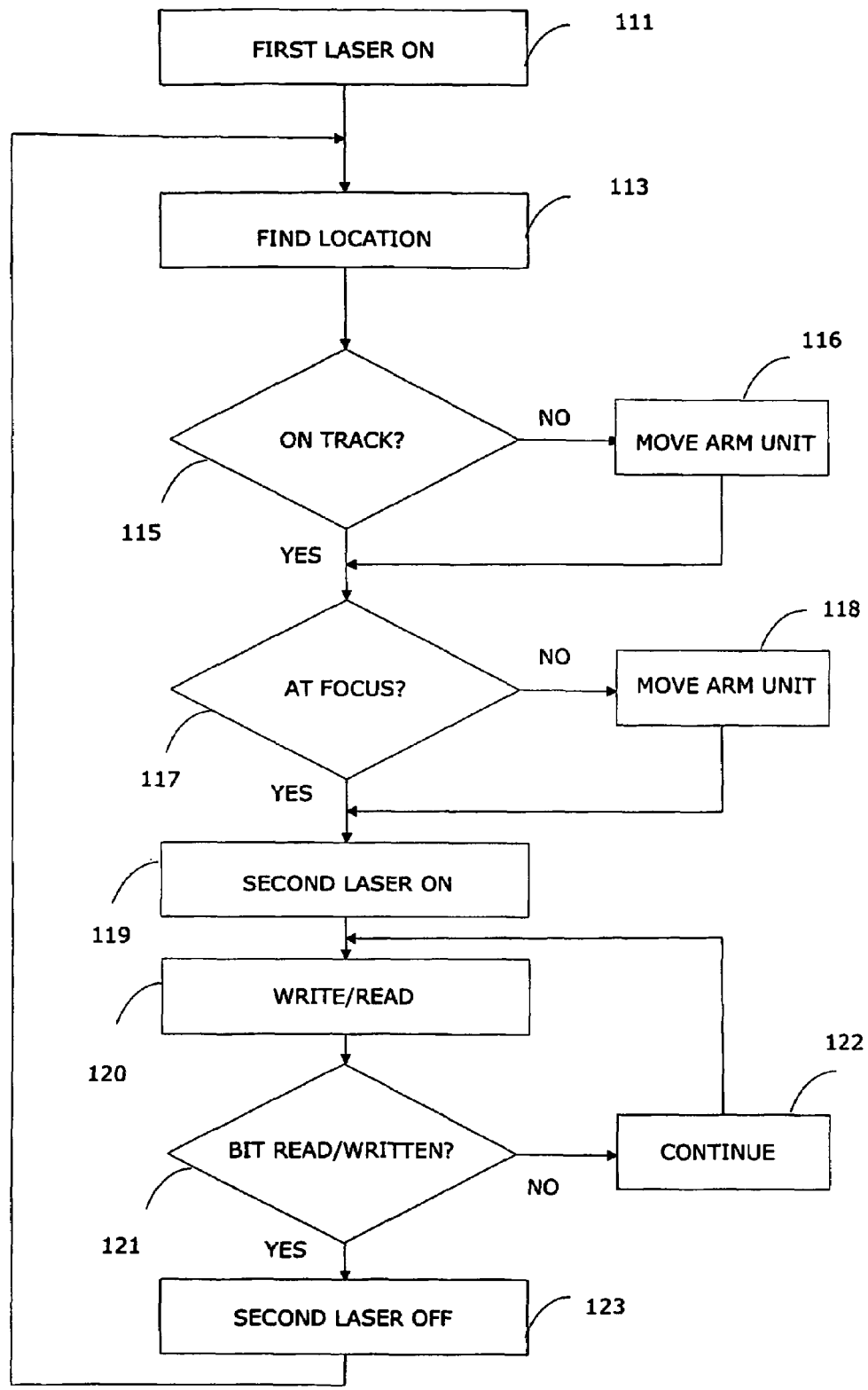
FIG. 10a illustrates a flow diagram of an algorithm for a method according to an embodiment of the invention.

FIG. 10a illustrates the synchronization algorithm of the method according to the invention, if two separate light sources are used. Separate initialization routine may be needed. In first step 111 the first light source is switched on, and then in step 113 the location of the light beam of the first light source is detected. It is further checked in step 115 that location is on track and in step 117 that the location is at focus. If the answer in steps 115 and/or 117 is negative, the appropriate corrections are made according to steps 116 and 118. In step 119 the second light source is turned on, and in consequence the first light source may be turned off or it is kept on constantly. The operation of the second light source is executed in step 120 and after succesful operation 121 the second light source is turned off in step 123. After this the first light source (is turned on) and continues the operation it was doing before interruption. As an exemplary embodiment of the method according to the invention is the situation, that the first light source is used for read operation and the second source for write operation. According to this example the read beam may be pulsed so that it is off when the write beam is turned on, or it can be kept on constantly. The energy-optimal and thermally optimal pulsing implementation depends on details of the physical implementation.

Figure 10B:
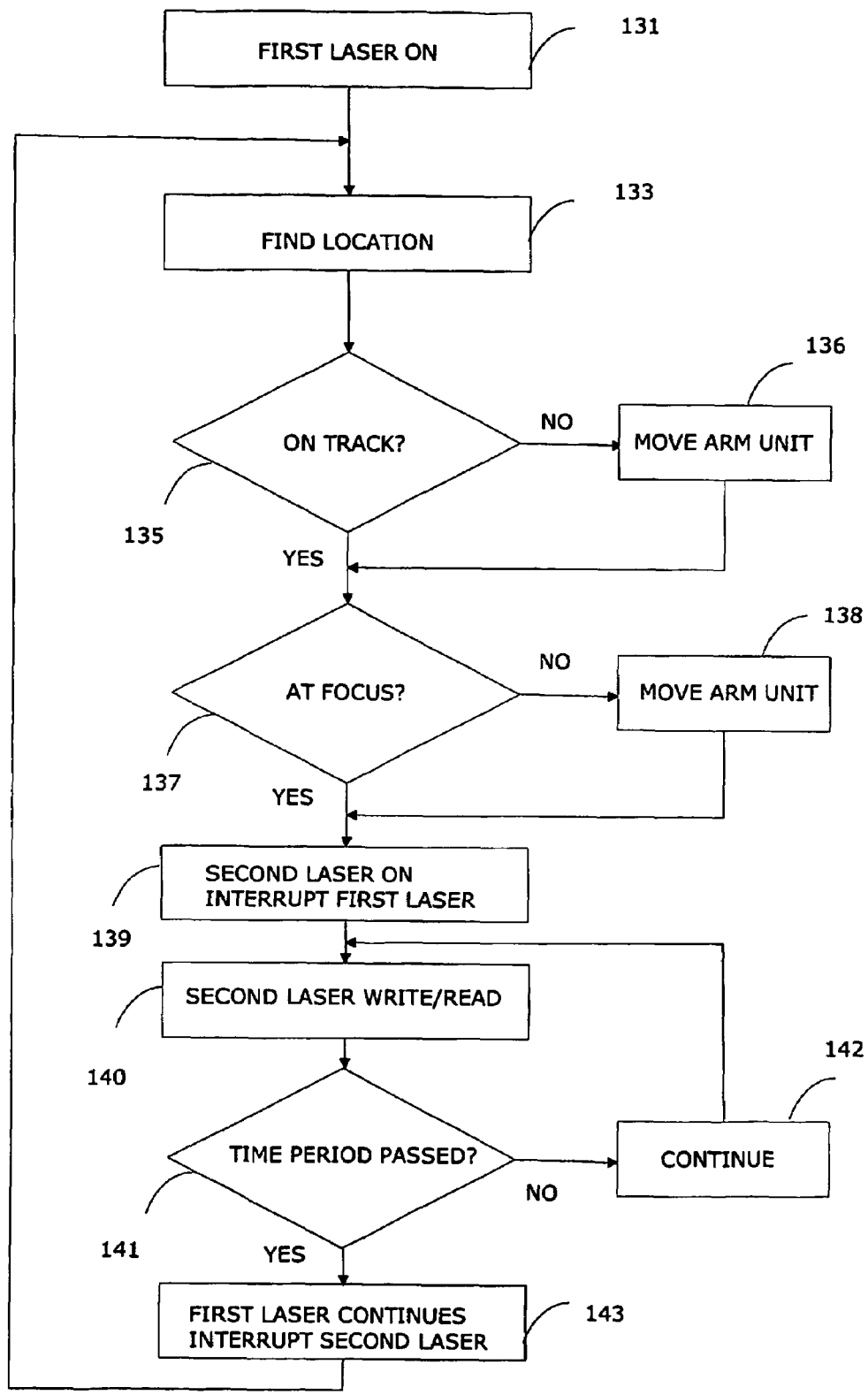
FIG. 10b illustrates a flow diagram of an algorithm for a method according to another embodiment of the invention.

Also the use of other kind of synchronization algorithms are possible. FIG. 10b describes a synchronization algorithm of another embodiment of a method according to the invention, if two separate light sources are used. Separate initialization routine may be needed. In first step 131 the first light source is switched on, and then in step 133 the location of the light beam of the first light source is detected. It is further checked in step 135 that location is on track and in step 137 that the location is in focus. If the answer in steps 135 and/or 137 is negative, the appropriate corrections are made according to steps 136 and 138. In step 139 the second light source is turned on, and in consequence the first light is kept on but a read/write operation is interrupt for a certain time period. The operation of the second light source is executed in step 140 untill said time period is elapsed according step 141 and 142. Now in step 143 the first laser source continues read/write operation from the location where it was when the operation was interrupt and the read/write operation of the second light source is interrupt. According to this embodiment both laser sources are on at same time.

According to the invention other embodiments with one or more light beams of the kind described earlier are also possible, and they are straightforward extensions of these, but they are not covered in detail here.

The invention is not restricted to the embodiments described above. While a preferred embodiment of the present invention is disclosed herein for purposes of explanation, numerous changes, modifications, variations, substitutions and equivalents in whole or in part should now be apparent to those skilled in art to which the invention pertains. Accordingly, it is intended that the present invention be limited only the characteristics and scope of the hereto appended claims.

The invention claimed is:

1. A device comprising:
   an optical storage medium drive;
   an optical storage medium comprising a plurality of data tracks;
   at least one access unit for reading out data from and writing data to said optical storage medium;
   a single light source arranged to produce at least one first light beam and at least one second light beam;
   optics arranged to transmit and guide said first light beam and said second light beam towards said data tracks of the optical storage medium; and
   a detector arranged to detect light beams that are reflected from the surface of the optical storage medium, wherein
      said access unit is arranged to pivot on one end at a pivot point in order to move three-dimensionally in relation to the pivot point,
      said optics and said detector are arranged to move in accordance with the movement of said access unit,
      said optics are arranged to guide said first light beam transversal directly to data tracks of the optical storage medium in accordance with the movement of said access unit, and
      said detector is arranged to receive the reflected beams of said first light beam or said second light beam from said data tracks of the optical storage medium in order to control the movement of said access unit.

2. A device according to claim 1, wherein said access unit is arranged to be movable to a position, in which said first light beam and said second light beam transmitted from said optics towards said data tracks of the optical storage medium form a first point and a second point on said data tracks of the optical storage medium where the reflected light beams are detected to be in focus and on track by said detector.

3. A device according to claim 2, wherein said first point is arranged to be located in a different location than said second point on said data tracks of the optical storage medium.

4. A device according to claim 2, wherein said first point is arranged to be located slightly ahead of said second point on said data tracks of the optical storage medium.

5. A device according to claim 2, wherein said first point and said second point are arranged to be located in a same intersection point on the track of the optical storage medium.

6. A device according to claim 1, wherein said optics are arranged to guide said first light beam transversal directly to said data tracks of the optical storage medium, and said second light beam perpendicular to said data tracks of the optical storage medium.

7. A device according to claim 6, wherein said first light beam is arranged to read out data from said data tracks of the optical storage medium and said second light beam is arranged to write data to said data tracks of the optical storage medium.

8. A device according to claim 1, wherein at least one light source is arranged to be located at or substantial proximity of the pivot point of said access unit.

9. A device according to claim 1, wherein said optics comprise at least one first optical component for bending said first light beam and said second light beam towards said data tracks of the optical storage medium, and at least one second optical component for bending and focusing said first light beam and said second light beam transversal directly to said data tracks of the optical storage medium.

10. A device according to claim 9, wherein said optics further comprise collimating optics for said light source, splitting optics for splitting the emitted light into multiple light beams and focusing optics in connection with said second optical component.

11. A device according to claim 9, wherein said first optical component and said second optical component are arranged to be a single lens for bending and focusing said first light beam transversal directly to said data tracks of the optical storage medium and said second light beam perpendicular to said data tracks of the optical storage medium.

12. A device according to claim 9, wherein said first light beam and said second light beam are arranged to have opposite polarizations.

13. A device according to claim 9, wherein said first light beam and said second light beam are arranged to have different wavelengths.

14. A device according to claim 1, wherein said detector comprises at least one detector element for detecting the reflected light beams of said first light beam or said second light beam, and a third optical component for bending and focusing said reflected light beams of said first or second light beam.

15. A device according to claim 14, wherein said detector further comprises a fourth optical component for bending the reflected light beams of said first light beam or said second light beam towards said detector element, focusing optics in front of said detector element and splitting optics for splitting said reflected light beams of said first light beam or said second light beam into multiple light beams.

16. A device according to claim 14, wherein said detector element comprises at least two detector surfaces for detecting the focusing signal and tracking signal of the reflected light beams of said first light beam or said second light beam.

17. A device according to any of claims 14, wherein said detector element is arranged to detect by said detector surface of said detector element at least one focusing signal and at least one tracking signal of the reflected beams of said first light beam or said second light beam received from the surface of the optical storage medium, and said detector element is arranged to control the movement of said access unit according to said focusing signal and said tracking signal detected by said detector surface to keep said first light beam and said second light beam in focus and on track.

18. A device according to claim 14, wherein said detector element is arranged to detect by said detector surface of said detector element identifying a change in the intensity distribution of at least one focusing signal and at least one tracking signal of the reflected beams of said first light beam or said second light beam received from the surface of the optical storage medium, and said detector element is arranged to control the movement of said access unit by following said change in the intensity distribution to keep said first light beam and said second light beam in focus and on track.

19. A device according to claim 15, wherein said focusing optics in front of said detector element comprises diffractive optical elements.

20. A device according to claim 1, wherein said optics and said detector further comprise a waveguide or lightguide arranged to transmit said first and second light beam and/or said reflected light beams of said first light beam or said second light beam along said access unit.

21. A device according to claim 1, wherein said access unit is an arm unit.

22. A device according to claim 1, wherein the device comprises a first access unit for reading out data from the optical storage medium, and a second access unit for writing data to the optical storage medium, wherein said first access unit and said second access unit is one of the following: an arm unit, a sledge unit or any combination of an arm and sledge unit.

23. A device according to claim 1, wherein said device is a communication device.

24. A device comprising:
   an optical storage medium drive;
   an optical storage medium comprising a plurality of data tracks;
   at least one access unit for reading out data from and writing data to said optical storage medium;
   at least one light source arranged to produce at least one first light beam and at least one second light beam;
   optics arranged to transmit and guide said first light beam and said second light beam towards said data tracks of the optical storage medium; and
   a detector arranged to detect light beams that are reflected from the surface of the optical storage medium, wherein
      said access unit is arranged to pivot on one end at a pivot point in order to move three-dimensionally in relation to the pivot point,
      said optics and said detector are arranged to move in accordance with the movement of said access unit,
      said optics are arranged to guide said first light beam and said second light beam transversal directly to data tracks of the optical storage medium in accordance with the movement of said access unit, and
      said detector is arranged to receive the reflected beams of said first light beam or said second light beam from said data tracks of the optical storage medium in order to control the movement of said access unit.

25. A device according to claim 24, wherein said first light beam is arranged to be produced by a first laser source and be transmitted by a first light beam path; said second light beam is arranged to be produced by a second laser source and be transmitted by a second light beam path; and said first laser source and said second laser source are arranged to be synchronized by a synchronizer.

26. A device according to claim 25, wherein said first light beam path and said second light beam path are arranged to use the same first and second optical components.

27. A method, comprising:
   producing at least one first light beam and at least one second light beam by a single light source;
   transmitting and guiding said first light beam and said second light beam towards data tracks of an optical storage medium; and
   detecting the light beams that are reflected from a surface of the optical storage medium wherein the detecting comprises:
      moving an access unit three-dimensionally in relation to a pivot point on one end to focus and track said first and second light beams;
      guiding said first light beam transversal directly to said data tracks of the optical storage medium three-dimensionally in accordance with the movement of said access unit; and
      receiving the reflected beams of said first light beam or said second light beam from said data tracks of the optical storage medium three-dimensionally in accordance with the movement of said access unit.

28. A method according to claim 27, wherein said access unit is controllable to a position, in which said first light beam and said second light beam transmitted and the reflected light beams of said first light beam or said second light beam detected, to form at least one first focused beam and at least one second focused beam on said data tracks of the optical storage medium on the basis of said first light beam, said second light beam and said reflected light beam of said first light beam or said second light beam.

29. A method according to claim 28, wherein said first focused beam forms at least one first point and said second focused beam forms at least one second point on said data tracks of the optical storage medium.

30. A method according to claim 29, wherein said first point is located in a different location than said second point on said tracks of the optical storage medium.

31. A method according to claim 29, wherein said first point is located slightly ahead of said second point on said tracks of the optical storage medium.

32. A method according to claim 29, wherein said first point and said second point are located in a same intersection point on the track of the optical storage medium.

33. A method according to claim 27, wherein said first light beam is transmitted and guided transversal directly to said data tracks of the optical storage medium, and said second light beam perpendicular to said data tracks of the optical storage medium.

34. A method according to claim 33, wherein said first light beam reads out data from and said second light beam writes data to said data tracks of the optical storage medium.

35. A method according to claim 27, wherein at least one first optical component bends said first light beam and said second light beam towards said data tracks of the optical storage medium, and at least one second optical component bends and focuses said first light beam and second light beam transversal directly to said data tracks of the optical storage medium.

36. A method according to claim 35, wherein collimating optics collimates said light source, splitting optics splits the emitted light into multiple light beams and focusing optics in connection with said second component focuses light beams.

37. A method according to claim 35, wherein said first optical component and second optical component is a single lens that bends and focuses said first light beam transversal directly to said data tracks of the optical storage medium and said second light beam perpendicular to said data tracks of the optical storage medium.

38. A method according to claim 35, wherein said first light beam and said second light beam have opposite polarizations.

39. A method according to claim 35, wherein said first light beam and said second light beam have different wavelengths.

40. A method according to claim 27, wherein at least one detector element detects the reflected light beams of said first light beam or said second light beam and a third optical component bends and focuses said reflected light beams of said first light beam or said second light beam.

41. A method according to claim 40, wherein a fourth optical component bends said reflected light beams of said first light beam or said second light beam towards said detector element, focusing optics in front of said detector element focuses and splitting optics splits said reflected light beams of said first light beam or said second light beam into multiple light beams.

42. A method according to claim 40, wherein said detector element comprises at least two detector surfaces for detecting the focusing signal and tracking signal of the reflected light beams of said first light beam or said second light beam.

43. A method according to claim 40, wherein said detector element detects by said detector surface of said detector element at least one focusing signal and at least one tracking signal of the reflected beams of said first light beam or said second light beam received from the surface of the optical storage medium, and said detector element controls the movement of said access unit according to said focusing signal and said tracking signal detected by said detector surface to keep said first light beam and said second light beam in focus and on track.

44. A method according to claim 40, wherein said detector element detects by said detector surface of said detector element identifying a change in the intensity distribution of at least one focusing signal and at least one tracking signal of the reflected beams of said first light beam or said second light beam received from the surface of the optical storage medium, and said detector element controls the movement of said access unit by following said change in the intensity distribution to keep said first light beam and said second light beam in focus and on track.

45. A method according to claim 27, wherein said access unit is an arm unit.

46. A method according to claim 27, wherein a first access unit reads out data from the optical storage medium, and a second access unit writes data to the optical storage medium, wherein said first and said second access unit is one of the following: an arm unit, a sledge unit or any combination of an arm and sledge unit.

47. A method according to claim 27, wherein said device is a communication device.

48. A method, comprising:
producing at least one first light beam and at least one second light beam by at least one light source;
transmitting and guiding said first light beam and said second light beam towards data tracks of an optical storage medium; and
detecting the light beams that are reflected from a surface of the optical storage medium wherein the detecting comprises:
moving an access unit three-dimensionally in relation to a pivot point on one end to focus and track said first and second light beams;
guiding said first light beam transversal directly to said data tracks of the optical storage medium three-dimensionally in accordance with the movement of said access unit; and
receiving the reflected beams of said first light beam or said second light beam from said data tracks of the optical storage medium three-dimensionally in accordance with the movement of said access unit;
a first laser source produces said first light beam and a second laser source produces said second light beam; and said first laser source and said second laser source are synchronized,
a first laser source and a second laser source are initialized separately,
said first laser source turns on,
said first laser source emits said first light beam and a first point is located for read/write operation,
a location of said first point is analyzed,
a focusing and tracking of said first point is analyzed,
said second laser source turns on,
said second laser source emits said second light beam and a second point is located for read/write operation, and
said second laser source turns off after said read/write operation.

49. A method according to claim 48, wherein said second laser source turns on resulting said first laser source to go in an interrupt mode for a predetermined time period to said first point, and said first laser source continues read/write operation from said first point after the predetermined time period and said second laser source goes in an interrupt mode.

50. An apparatus comprising:
    means for driving an optical storage medium comprising a plurality of data tracks;
    at least one means for accessing data configured to read out data from and write data to said optical storage medium;
    integral means for supplying light configured to produce at least one first light beam and at least one second light beam;
    means for optically processing light configured to transmit and guide said first light beam and said second light beam towards said data tracks of the optical storage medium; and
    means for detecting configured to detect light beams that are reflected from the surface of the optical storage medium, wherein
        said means for accessing data is configured to pivot on one end at a pivot point in order to move three-dimensionally in relation to the pivot point,
        said means for optically processing light and said means for detecting are configured to move in accordance with the movement of said means for accessing data,
        said means for optically processing light is configured to guide said first light beam transversal to data tracks of the optical storage medium in accordance with the movement of said means for accessing data, and
        said means for detecting is configured to receive the reflected beams of said first light beam or said second light beam from said data tracks of the optical storage medium in order to control the movement of said means for accessing data.

51. A method, comprising:
    producing at least one first light beam and at least one second light beam by at least one light source;
    transmitting and guiding said first light beam and said second light beam towards data tracks of an optical storage medium; and
    detecting light beams that are reflected from a surface of the optical storage medium wherein the detecting comprises:
        moving an access unit three-dimensionally in relation to a pivot point on one end to focus and track said first and second light beams;
        guiding said first and second light beams transversal directly to said data tracks of the optical storage medium three-dimensionally in accordance with the movement of said access unit; and
        receiving the reflected beams of said first light beam or said second light beam from said data tracks of the optical storage medium three-dimensionally in accordance with the movement of said access unit.

* * * * *